United States Patent
Puranik et al.

(10) Patent No.: US 9,509,650 B2
(45) Date of Patent: Nov. 29, 2016

(54) ELECTRONIC MESSAGE MANAGEMENT WITH CONVERSATION PARTICIPATION STATUS

(71) Applicant: eProductivite, LLC, Orinda, CA (US)

(72) Inventors: Ganesh Puranik, Orinda, CA (US); Mike Robinson, Orinda, CA (US)

(73) Assignee: BetterEmailing, LLC, Orinda, CA (US)

( * ) Notice: Subject to any disclaimer, the term of this patent is extended or adjusted under 35 U.S.C. 154(b) by 0 days.

(21) Appl. No.: 14/586,706

(22) Filed: Dec. 30, 2014

(65) Prior Publication Data
US 2016/0065520 A1 Mar. 3, 2016

Related U.S. Application Data

(60) Provisional application No. 62/044,042, filed on Aug. 29, 2014.

(51) Int. Cl.
*H04L 12/58* (2006.01)
*G06F 3/0482* (2013.01)

(52) U.S. Cl.
CPC ............ *H04L 51/16* (2013.01); *G06F 3/0482* (2013.01)

(58) Field of Classification Search
CPC ............ G06Q 10/10; G06Q 10/107; H04M 1/72552; H04M 1/72555; H04L 12/581; H04L 12/1813
USPC ............................ 707/722; 709/206; 715/752
See application file for complete search history.

(56) References Cited

U.S. PATENT DOCUMENTS 6,400,810 B1  6/2002  Skladman et al.
6,721,785 B1  4/2004  Raghunandan (Continued)

FOREIGN PATENT DOCUMENTS

EP  049137 A2  6/1992
EP  1063821 A2  12/2000

(Continued)

OTHER PUBLICATIONS

CanFocus. MyFocus. Digital & Physical Work Distractions—Controlled. [online]. Kickstarter, Sep. 24, 2013. [retrieved on Aug. 29, 2014] Retrieved from the Internet: <URL: https://www.kickstarter.com/projects/875757448/myfocus-intercept-the-distractions-take-back-your?>, 9 pages.

(Continued)

*Primary Examiner* — Jeffrey A Gaffin
*Assistant Examiner* — Mandrita Brahmachari
(74) *Attorney, Agent, or Firm* — Kilpatrick Townsend & Stockton, LLP

(57) ABSTRACT

Electronic message management with conversation participation status is enabled. Accordingly, time may be saved and lost productivity due to overload of messages may be reduced. Electronic conversations may be associated with a set of participants. Each participant may have a varying and/or changing level of interest in the conversation. Each participant may specify a conversation participation status and the conversation participation status and/or user status of each participant may be communicated and/or presented to each of the other participants. Messaging clients may change presentation of conversations and/or electronic messages for a participant based on the participant's specified conversation participation status. Participants sending messages may specify message status specific for each participant to alter treatment of message that would be based on participant status and/or conversation participation status when message is received by each participant.

21 Claims, 32 Drawing Sheets

(56) References Cited

U.S. PATENT DOCUMENTS

| | | |
|---|---|---|
| 7,428,579 B2 | 9/2008 | Libbey et al. |
| 7,587,461 B2 | 9/2009 | Baluja et al. |
| 7,610,341 B2 | 10/2009 | Daniell |
| 7,720,911 B2 | 5/2010 | Addante et al. |
| 7,886,009 B2 | 2/2011 | Faber et al. |
| 7,979,495 B2 | 7/2011 | Radenkovic et al. |
| 7,996,476 B2 | 8/2011 | Geffner et al. |
| 8,073,910 B2 | 12/2011 | Tokuda et al. |
| 8,086,672 B2 | 12/2011 | Horvitz |
| 8,112,485 B1 | 2/2012 | Cooley et al. |
| 8,255,468 B2 | 8/2012 | Vitaldevara et al. |
| 8,606,867 B2 | 12/2013 | Deshpande et al. |
| 8,615,558 B2 | 12/2013 | Fukuzato |
| 9,009,142 B2* | 4/2015 | Palay ............................ 707/722 |
| 2002/0087646 A1 | 7/2002 | Hickey et al. |
| 2003/0065728 A1* | 4/2003 | Milovanovic ........ G06Q 10/107 709/206 |
| 2003/0120733 A1 | 6/2003 | Forman |
| 2003/0135565 A1 | 7/2003 | Estrada et al. |
| 2005/0267944 A1 | 12/2005 | Little |
| 2006/0019638 A1* | 1/2006 | Chiu .................... G06Q 10/109 455/412.2 |
| 2006/0041625 A1 | 2/2006 | Chen et al. |
| 2006/0294188 A1 | 12/2006 | Daniels et al. |
| 2007/0115959 A1 | 5/2007 | Parker et al. |
| 2008/0098071 A1 | 4/2008 | Jones et al. |
| 2008/0250106 A1 | 10/2008 | Rugg et al. |
| 2009/0077105 A1* | 3/2009 | DeAnna et al. .............. 707/100 |
| 2010/0037146 A1 | 2/2010 | Belsky et al. |
| 2010/0198921 A1 | 8/2010 | Choi et al. |
| 2010/0211592 A1* | 8/2010 | Brownlee ................ H04L 12/58 707/769 |
| 2011/0295889 A1* | 12/2011 | Xu .......................... G06Q 10/10 707/770 |
| 2012/0042017 A1 | 2/2012 | Fried |
| 2012/0198017 A1* | 8/2012 | LeVasseur .............. H04L 51/24 709/206 |
| 2012/0198372 A1 | 8/2012 | Kuhlke |
| 2013/0124642 A1* | 5/2013 | Bansal .................... H04L 12/12 709/206 |
| 2013/0227034 A1* | 8/2013 | Jiang ...................... H04L 51/043 709/206 |
| 2013/0315041 A1* | 11/2013 | Hiremath ................ G06Q 10/10 368/10 |
| 2014/0082494 A1* | 3/2014 | Harari ...................... H04L 51/22 715/716 |
| 2014/0229853 A1* | 8/2014 | Cho .............................. 715/752 |
| 2015/0263997 A1* | 9/2015 | Abate .................... H04L 51/046 715/753 |
| 2015/0264146 A1* | 9/2015 | Cudak ..................... H04L 67/22 379/142.01 |

FOREIGN PATENT DOCUMENTS

| | | |
|---|---|---|
| JP | 2002032307 A | 1/2002 |
| WO | 0206969 | 1/2002 |
| WO | 2005124576 | 12/2005 |
| WO | 2011158033 | 12/2011 |
| WO | 2014123927 | 8/2014 |

OTHER PUBLICATIONS

Djian, David. Communication management: E-mail and telephone Assistants in Azvine et al. (Eds.), *Intelligent Systems and Soft Computing* (Heidelberg, Springer-Verlag, 2000), pp. 284-300.

Evite Review. [online]. Top 10 Reviews, Mar. 2011 [retrieved on Aug. 29, 2014]. Retrieved from the Internet: <URL: http://party-planning-services-review.toptenreviews.com/evite-review.html 1 of>, 3 pages.

Weinstein, Elizabeth. "Help! I'm Drowning in E-Mail!". [online]. Wall Street Journal, 2002. [retrieved on Aug. 29, 2014]. Retrieved from the Internet: <URL: https://www.women-unlimited.com/resources/natl_lead/drowning.pdf>, 2 pages.

Williams, Eric. E-mail and the effect of future developments. [online]. *First Monday*, vol. 4, No. 8, Aug. 1999 [retrieved on Aug. 29, 2014]. Retrieved from the Internet: <URL: http://uncommonculture.org/ojs/index.php/fm/article/view/686/596>, 13 pages.

Pejic, Sue. *Microsoft Outlook 2010: The Essentials, Training User Guide*. Swinburne University of Technology (Mar. 2012), 35 pages.

PCT/US2015/047279, International Search Report and Written Opinion, mailed Nov. 26, 2015, 7 pages.

* cited by examiner

ELECTRONIC MESSAGE MANAGEMENT WITH CONVERSATION PARTICIPATION STATUS

CROSS-REFERENCES TO RELATED APPLICATIONS

The present application claims the benefit of U.S. Provisional Application No. 62/044,042, filed Aug. 29, 2014, the full disclosure of which is incorporated herein by reference.

TECHNICAL FIELD

This invention relates generally to computer-facilitated communication and more particularly to electronic messaging with human-readable content.

BACKGROUND

Email has become a common tool with respect to business communication. Other types of electronic messages such as instant messages, text messages, and social networking posts are catching up fast. Email can be an efficient communication mechanism, for example, when sending a message to a limited or large number of recipients, who may be near the sender's work location or across the globe. The recipients of a message can then add further recipients to the communication, reply "to all" or to a few, and propagate these messages.

Unfortunately, the ease of using email can also make it into a nuisance. It is not uncommon that users receive hundreds of emails a week, some or even many of which they do not need to receive or have low relevance. By some estimates about 10% of employee time is being wasted in attending to unnecessary internal emails. In many cases, such emails cannot be filtered as effectively as external junk emails. With many email participants clicking the "reply-all" button, the recipients of these emails can become victims of email overload.

Conventional attempts to address these issues are inefficient, ineffective and/or have undesirable side effects or other drawbacks with respect to at least one significant use case.

For example, some electronic messaging management tools have functionality such as "kill an email thread" or "mute an email thread." However the other participants of the conversation do not become aware when one or more of the recipients are ignoring the conversation. As another example, some electronic messaging management tools attempt to inform subsequent repliers when they attempt to send an email to someone who has unsubscribed to the thread. However, thread participants do not know such information unless they have opted to send an email. As yet another example, some electronic messaging management tools send emails to all participants when one of the participants "opts out" from a message thread. However, this can actually create more traffic for the remaining participants, potentially causing more harm than good.

Embodiments of the invention are directed toward solving these and other problems individually and collectively.

BRIEF DESCRIPTION OF THE DRAWINGS

Various embodiments in accordance with the present disclosure will be described with reference to the drawings, in which.

DETAILED DESCRIPTION

Figure 1:
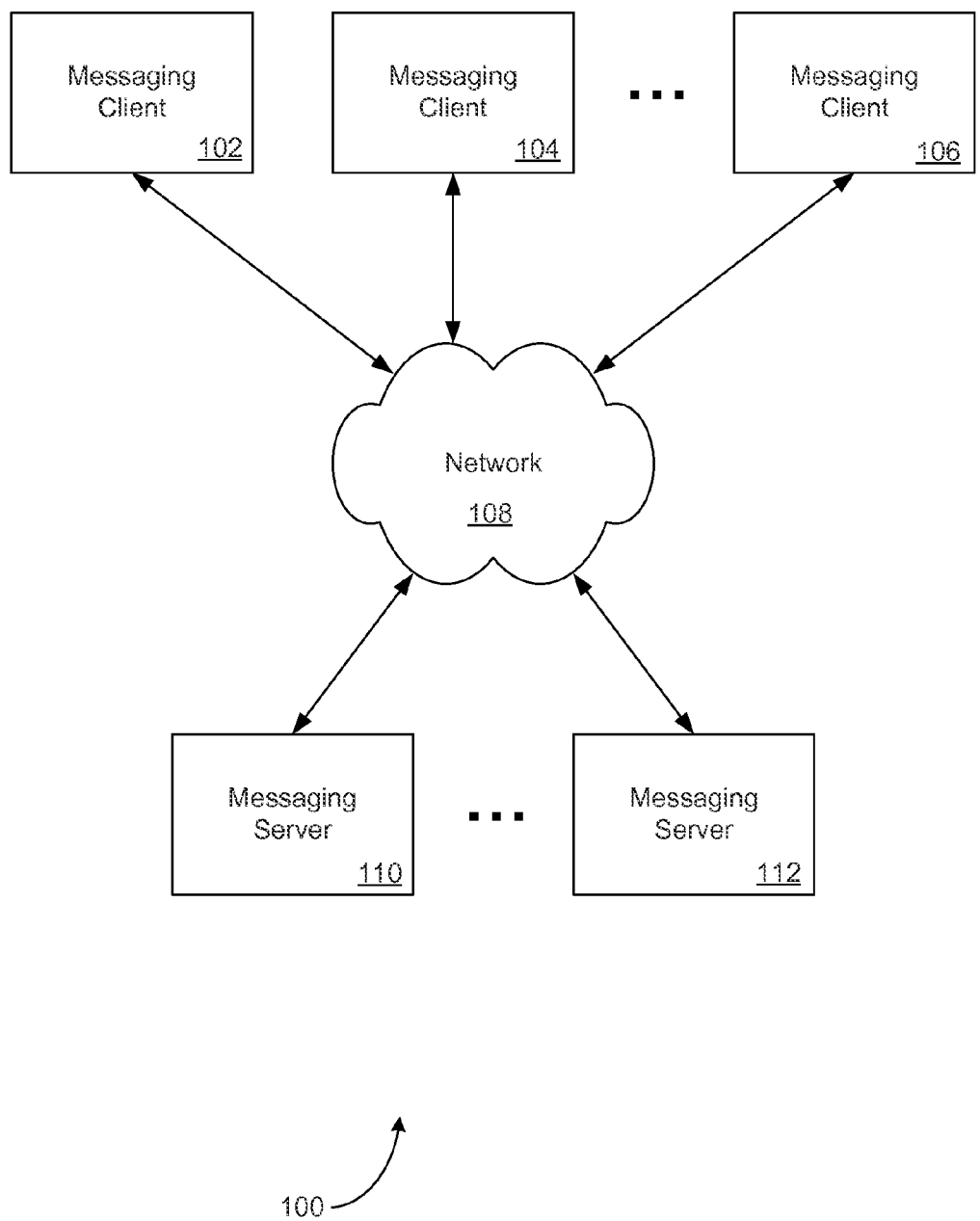
FIG. 1 is a schematic diagram depicting aspects of an example networking environment suited to at least one embodiment of the invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

In accordance with at least one embodiment of the invention, electronic message management with conversation participation status is enabled. Utilizing methods, articles and systems in accordance with at least one embodiment of the invention, time may be saved and lost productivity due to overload of messages may be reduced. Sets of electronic messages (e.g., email messages) may be identified as associated with an electronic conversation (e.g., by subject line or any suitable conversation identification technique). The electronic conversation ("conversation") may then be associated with a set of participants. Each participant may have a varying and/or changing level of interest in the conversation. In accordance with at least one embodiment of the invention, each participant may specify a conversation participation status, and the conversation participation status of each participant may be communicated and/or presented to each or some of the other participants depending on security settings. Alternatively, or in addition, each conversation participant may specify a "participant status" such as "busy", "do not disturb" or "quiet mode", and the participant status of each participant may be likewise communicated and/or presented to each or some of the other participants depending on security settings. As a further alternative, or further in addition, the conversation itself may have a status ("conversation status") such as "closed", and the conversation status may be likewise communicated and/or presented to each or some of the other participants depending on security settings. Participants may change their conversation participation status, participant status and/or the conversation status from time to time and updated status may be communicated and/or presented to each or some of the other participants depending on security settings. Messaging clients may change presentation of conversations and/or electronic messages for a participant based on the participant's specified conversation participation status. Further, participants sending messages may be able to see conversation participation status and/or participant status for each or some of the intended recipients and may be able to alter behavior of the message presentation for each or some of the recipients.

For example, a particular participant, Alice, may specify a "sideline" status for a particular conversation. Information regarding Alice's new conversation participation status is provided to each other participant in the conversation: Bob, Carol, David. Bob, Carol and David are now aware that Alice is paying less immediate attention to the conversation. For example, Alice's messaging client may be configured to store messages associated with a sidelined conversation in a dedicated presentation grouping (e.g., a special purpose "sidelined" email conversation folder) or weight associated messages lower as part of a relevance scoring algorithm. Alice may provide an indication of the reason for the conversation participation status change (e.g., freeform text such as "Carol, will handle"). Specifying a conversation participation status may be performed manually using one or more suitable user interface elements. Alternatively, or in addition, conversation participation status may be set according to rules specified by a participant and/or an administrator (e.g., "Sideline conversation when email subject contains 'donuts'"). Further examples of conversation participation status types include redirected, withdrawn, and delegated, and are describe in more detail below. David may indicate that Alice's approval is needed in one of the messages during conversation and such a message may be treated differently, for example, sending to Alice's default inbox rather than moving it to a sidelined email conversation folder, so that Alice may see the message more readily.

Throughout this description "email" is used to refer to electronic messages for clarity. However, any suitable type of electronic messages may be utilized including, but not limited to, text messages, social networking messages, photo sharing, and voice messages delivered electronically. Wherever the term "email" is used, current and future electronic messages of various types may be substituted. Suitable electronic messages include messages received in an electronic inbox (sometimes called a virtual inbox) such as an email inbox, a wall such as used by Facebook, a voice message inbox, and a text messaging client. In addition, electronic messages are described throughout this description as being grouped into one or more "folders". However, any suitable type of email grouping mechanism may be utilized including, but not limited to, message tagging (e.g., messages with same tags are members of a corresponding group), message classification, message categorization, message grouping, message collections, message lists, message "walls" and/or "wall" posts, message streams, message channels, and message forums and sub-forums. Message groupings may be hierarchical and may be created, viewed, edited and deleted with user interface idioms and affordances corresponding to those for message folders such as "drag and drop" idioms.

In accordance with at least one embodiment of the invention, lost productivity due to email overload, particularly from users' colleagues and/or friends, may be reduced. These types of messages may not be filtered by junk mail filters, which typically target emails from bulk mailers, or relative strangers. Users are enabled to act on conversations rather than individual messages, to keep other selected participants of the messages in the know of what actions others have taken, and/or to reduce proliferation of messages. Overload of messages received by users may be reduced and/or made easier to find. Users are enabled to pay attention to messages more relevant to them, to experience less interruptions and loss of focus, to experience less lost opportunity costs due to fewer messages getting ignored, and/or to reduce time wasted in waiting for someone's reply (e.g., due to reduced overload). In a work context, team and/or employee morale may be enhanced, and increased job satisfaction may result.

At times, it is possible for an electronic messaging participant to assume that a person who should see a particular email is seeing it and to move on, when in fact the other person is buried under a lot of emails and doesn't see it in time, or has muted the conversation. In accordance with at least one embodiment of the invention, anyone looking at an email in the thread is enabled to readily see individuals currently ignoring an email thread (e.g., by "going to sideline") as well as those who may not have read the email already, and/or other suitable conversation participation states.

In accordance with at least one embodiment of the invention, electronic message management tools may provide one or more of the following features:

1) Ability for participants of conversation to:
   a) Go on sideline;
   b) Configure a tool to automatically go on sideline for conversations not attended to, or have the tool put conversation sidelined status automatically as per custom rules or default rules;
   c) Redirect a conversation to another person and remove self;
   d) Withdraw oneself from conversation;
   e) Re-invite a person back into conversation after they go on sideline, redirect, or withdraw from conversation;
   f) Add a new participant to the conversation;
   g) Close a conversation;
   h) Reopen closed conversation;
   i) Make a conversation high or low priority for self;
   j) Delegate a conversation to another person; and
   k) Optionally add a note regarding a reason for any of the actions (a)-(j).
2) Ability to know status of other participants—given appropriate permission—relating to the message or conversation, including:
   a) Know if the user has read the message;
   b) Know if the user is on sideline for a conversation intentionally or automatically;
   c) Know if user has redirected the conversation; and
   d) Know if user has chosen to withdraw from the conversation;
3) Ability to re-invite a user into conversation if they are on sideline for a conversation, have redirected it, or have withdrawn from it. Optionally ability to add note or reason while doing so;
4) Ability to set or change conversation priority for another user—with appropriate permissions;
5) Ability to set up quiet periods (also called "quiet mode" herein), so emails are not be delivered to inbox, unless they are marked urgent;
6) Ability of organizations and individual users to publish email processing expectations, so senders can decide if the emails they are sending is urgent, and recipients can schedule email processing times without worry;
7) Ability of a sender to, at least:
   a) Specify who needs to act upon receiving message, for whom the message is must read, and for whom the message is FYI;
   b) Selectively override conversation participation status and/or participant status to deliver message even if they are on sideline, withdrawn, redirected, or in quiet mode; and
   c) Selectively change priority of the message for one or more participants, so recipients see high priority messages which cannot wait for their usual processing time.

FIG. 1 depicts an example networking environment 100 suited to at least one embodiment of the invention. Multiple messaging clients 102, 104, 106 may communicatively interact through a network 108 with the support of one or more messaging servers 110, 112. The network may incorporate any suitable networking technology including wired and wireless networking technologies. Messaging clients 102, 104, 106 and messaging servers 110, 112 may be implemented with one or more computing devices and/or computing components including hardware, firmware and/or software components or modules in any suitable combination. Examples of suitable computing devices include personal computers such as workstations and desktop computers, portable computers, computerized televisions such as "smart TVs", laptop computers such as notebook computers, subnotebook computers, palmtop computers, tablet computers, pocket computers, computerized personal digital assistants (PDAs), computerized mobile phones such as "smart phones", electronic readers such as e-readers and e-book readers, wearable computers such as computerized watches and computerized glasses, as well as server-class computers and mainframe-class computers. Although multiple messaging servers are depicted, a single messaging server may be utilized in accordance with at least one embodiment of the invention. Alternatively, or in addition, a serverless networking environment (sometimes called a peer-to-peer or overlay networking environment) may be utilized in accordance with at least one embodiment of the invention. Where functionality is divided between a client and a server, some or all of the functionality may be relocated from the client to the server (e.g., with "thin" client techniques). Alternatively, some or all of the functionality may be relocated from the server to the client (e.g., with "fat" client techniques and/or serverless networking technologies). The distribution of functionality between client and server may be fluid and adaptive (e.g., to client, server and/or network performance). Client-server may be poll driven (e.g., servers are relatively passive, responding to client "polls" or requests) and/or event driven (e.g., servers actively "push" events to interested or subscribed clients). In FIG. 1, and throughout this specification, the ellipsis is used, as is conventional, to indicate "any suitable number" of objects.

Figure 2:
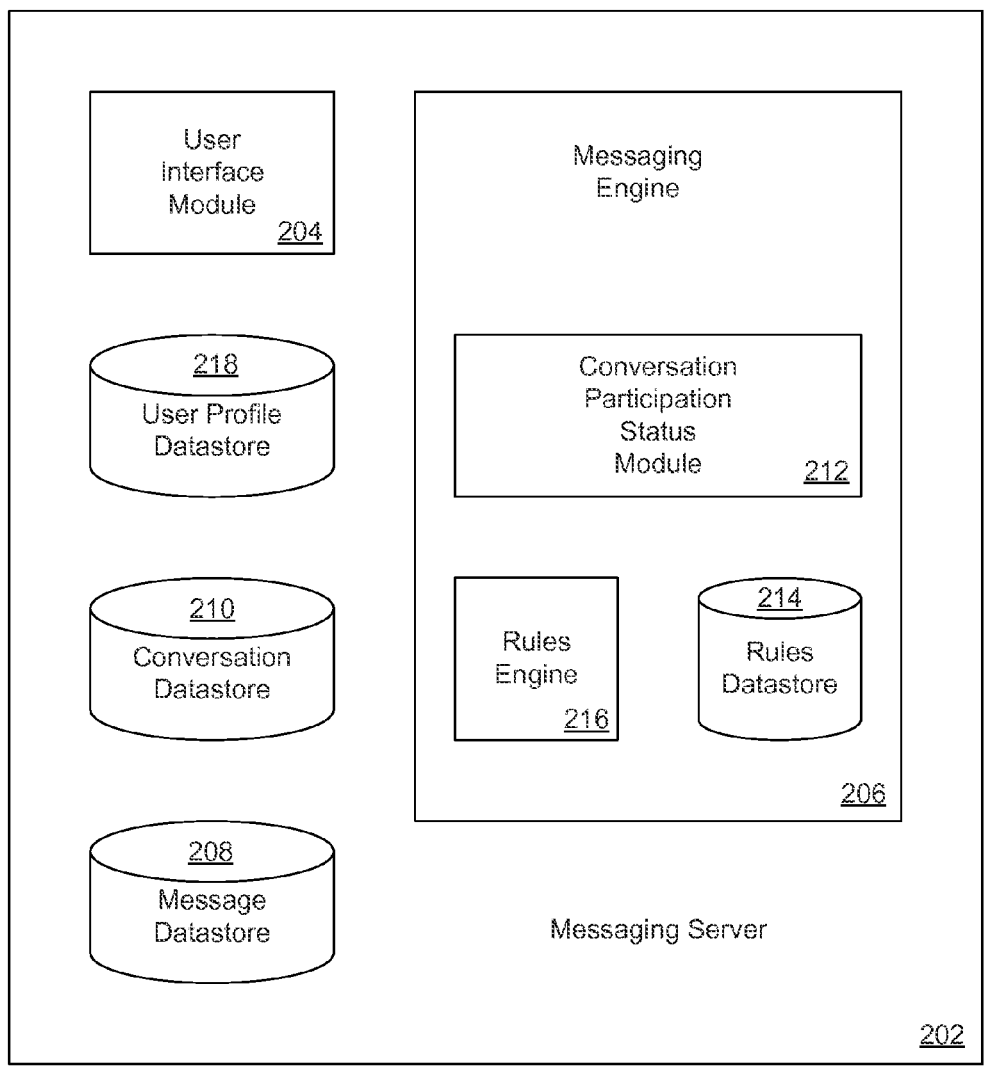
FIG. 2 is a schematic diagram depicting aspects of an example messaging server in accordance with at least one embodiment of the invention.

FIG. 2 depicts an example messaging server 202 in accordance with at least one embodiment of the invention. Conversation participants (and other users) interact with the messaging server 202 using the user interface module 204 which may maintain one or more user interfaces including programmatic user interfaces (e.g., application programming interfaces or "APIs") and graphical user interfaces (GUIs). A messaging engine 206 receives an incoming message and distributes the message to suitable participants based on associated participant lists (e.g., email address lists) and/or conversations. Messages and/or information about messages may be stored in a message datastore 208. As described in more detail below with reference to FIG. 3, conversations and/or information about conversations have additional structure, and may be stored in a separate conversation datastore 210.

In accordance with at least one embodiment of the invention, a conversation participation status module 212 may maintain a conversation participation status for each participant of each conversation, as well as provide updates with respect to conversation participation status changes to conversation participants. Message processing procedures may differ based on conversation participation status and the conversation participation status module 212 may determine suitable non-default procedures for processing a message based on one or more associated conversation participation status types (e.g., via a simple mapping). Alternatively, or in addition, the messaging engine 206 may make processing decisions based on conversation participation status. Conversation participation status may be updated manually (e.g., via a suitable user interface) and/or in accordance with specified rules. The rules may be stored in a rules datastore 214 and interpreted by a rules engine 216. Although the example depicted in FIG. 2 shows the conversation participation status module 212 incorporated into the messaging engine 206, each embodiment is not so limited. For example, the conversation participation status module 212 may be implemented as an external and/or "plug-in" module that interacts with the messaging engine 206 utilizing one or more programmatic interfaces such as application programming interfaces (APIs). As with other components of the messaging server 202, some or all of the functionality of the conversation participation status module 212 may be distributed to, located and/or implemented at the messaging clients 102, 104, 106 (FIG. 1).

User preferences and user status may be stored in a user profile datastore 218. User profiles may also include security tokens and verifiable permissions data enabling access to conversation participation status modifications and viewing. Any suitable aspect of conversation participation status access may be subject to one or more permissions. Users may be arranged in a hierarchy and/or groups with permissions configurable at hierarchy nodes and/or at the group level.

Figure 3:
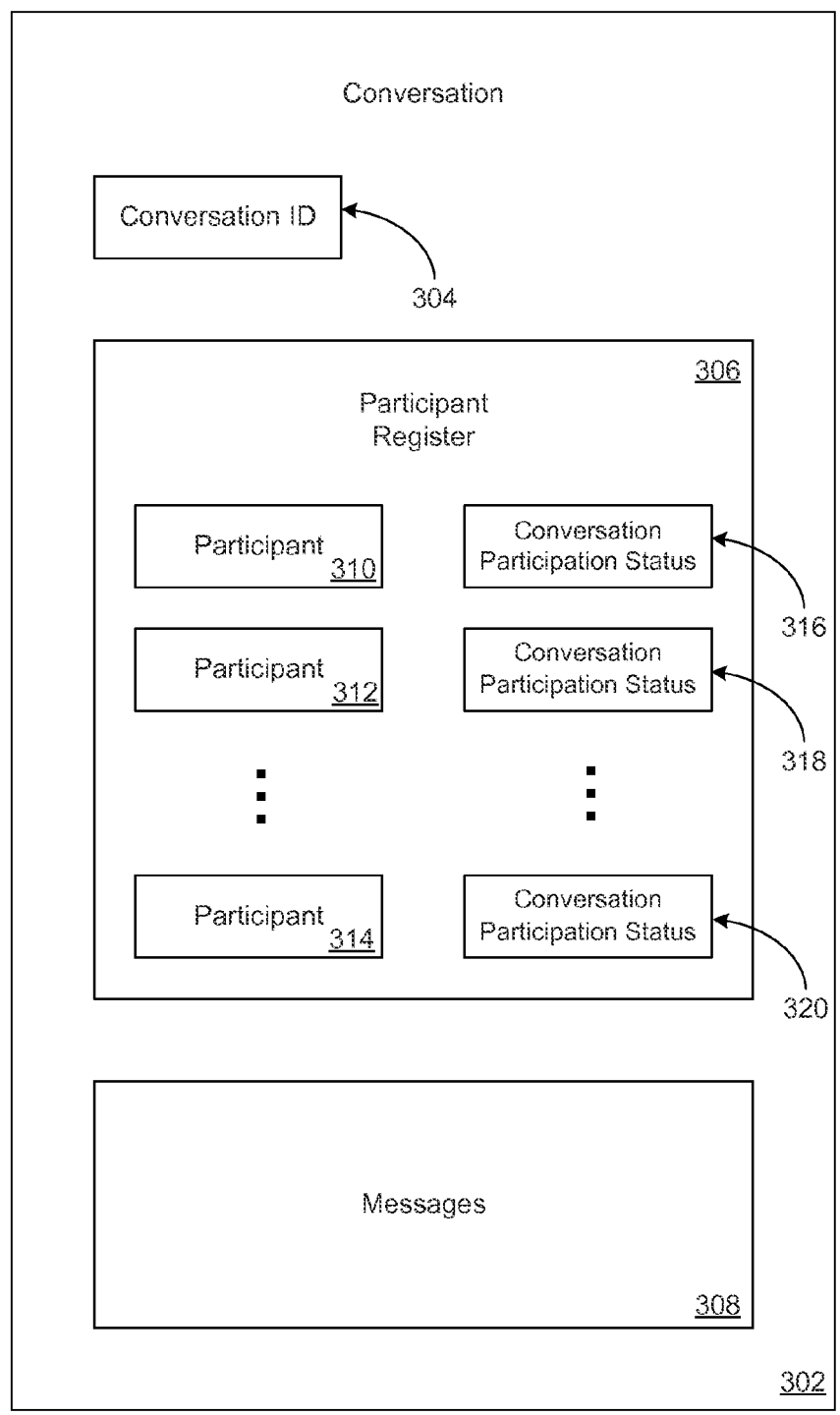
FIG. 3 is a data structure diagram depicting aspects of an example conversation data object in accordance with at least one embodiment of the invention.

FIG. 3 depicts aspects of an example conversation data object 302 in accordance with at least one embodiment of the invention. Such data objects 302 may be created, maintained and/or destroyed by various components and modules such as the conversation participation status module 212 (FIG. 2). The example conversation data object 302 includes a conversation ID 304 that uniquely identifies the conversation (e.g., since message "subject line" matching can be ambiguous), as well as a conversation participant register 306 and a set of associated messages 308. Various sub-objects, such as participants 310, 312, 314 and messages 308, may be references to full-weight data objects stored outside of the conversation data object. The participant register 306 includes a set of conversation participants 310, 312, 314. In addition, the participant register 306 includes at least one conversation participation status 316, 318, 320 for each participant 310, 312, 314.

The description now turns to example features in accordance with at least one embodiment of the invention. Aspects of such features may be better understood with reference to FIGS. 4-28. Options and features maybe provided independent of each other and/or in any suitable combination.

Sideline Feature

This feature may be used in cases such as these:
Upon receiving an email, user decides that they have a relatively low interest in the conversation. In such case they may opt to go on sideline.
A user—such as a manager—participates in conversation at first, and assigns the responsibility to subordinates. After this, the user decides to go on sideline, having reduced need to participate actively in the conversation.
Other users may have ability to bring a user back into the conversation.

In accordance with at least one embodiment of the invention, when the sideline command is invoked, the user's intention may be saved in a database meant for this purpose, and the messages in users Inbox pertaining to the same conversation may be acted upon in one of several ways based on implementation configuration or preference of implementer. E.g. (a) move unread messages pertaining to conversation to a designated sideline folder, (b) move all messages pertaining to this conversation to a designated sideline folder, (c) filter the messages out by default, (d) move them to sideline tab, etc. Any subsequently received messages pertaining to the same conversation may be moved, hidden, tabulated, etc. in a consistent manner as long as user stays on sideline for the conversation.

In accordance with at least one embodiment of the invention, email clients used by other participants of the conversation may query the shared data store and may display the status of conversation participants being on sideline in multiple ways based on user interface designer's preference. E.g. one way to indicate this is to add B super script next to participant's name who has put the conversation on sideline, the participant address/name may be struck out (e.g., "~~userv@acme.com~~ $^S$"), participant name/address may have a specific background/foreground color, may be in different font, and so on. Another way is to provide a command interface, so user can see detail information—e.g., when user clicks on the button, user sees a table with all participants, their status, reasons, etc.

So as to enable participants to have latest information, sideline status may be refreshed responsive to messaging client events, for example, whenever user views or opens a message, whenever user chooses to respond to the message and starts composing it by clicking reply or reply-all, and when the user chooses to send it. If more users have put conversation on sideline between reply and send commands, the client may alert user of such change and ask if user wishes to proceed, or wishes to make any changes to address list—such as include users gone on sideline. Alternatively, or in addition, sideline status may be refreshed periodically.

When a user chooses to go on sideline using appropriate user interface (click, touch, gesture, voice, etc.) a dialog may pop up, or other suitable user interface element may be presented, which may ask the user additional information to enhance functionality further. Such additional information may include:
a) Reason for going to sideline
System may ask user to pick a reason from a list of standard reasons and in addition, a way for user to provide custom reason not included in the standard list. The system may display this reason to conversation participants with appropriately designed user interface feature by the subject matter expert, e.g. one way is to show it with mouse-over event on the user's name in list; another way is to show when user right clicks on name/address along with command to bring user back into conversation; with smart phones and tablets finger hover may be used, etc.

b) Ability to customize how other messages in Inbox need to be treated when user goes on sideline System may offer user options for treatment of other messages pertaining to the same conversation in Inbox from various options such as, move messages that are unread to sideline folder, or move all messages (read/unread) for the conversation to sideline folder, etc. System may also offer to remember user default setting for the next time around and use it as default for future requests by the user.

c) Choice of sideline folder

System may allow the user to pick a specific sideline folder from a list of email folders. This way users who prefer to organize their messages may file the conversation in the right folder, instead of a default sideline folder.

d) Set authorization for who can see user is on sideline

System may offer user to set security option to choose who can see the conversation was put on sideline, e.g., show the status to internal participants sharing same domain, or participants belonging to custom group, e.g., my colleagues and my manager, etc. Such option may be useful in order to avoid offending an important client by telling them their message is on sideline, while risking missing subsequent messages from the client.

e) Automatically remove from sideline

System may provide option to reduce risk created by the feature in the above bullet by allowing user to specify conditions when conversation can be removed from sideline to bring user back into the conversation, such as when the conversation is not "closed" within certain period of time (needs intervention), or an email is received from certain email addresses (big boss is participating in conversation, then user wants to know), or email has user's name in it, etc.

f) Set a timer

System may offer to set a timer, so user may be reminded to check on how conversation went after some time.

g) Set priority or importance

System may offer the user to set priority of the conversation. Thus when the user, at a later time, reviews any conversations put on sideline, he/she can sort the conversations on sideline, and review conversations he/she deems more important first.

h) Set Delegate

System may offer the user to set delegate and may distinguish this type of sideline from others using a different status indicator. System may move delegated messages in different folder than merely sidelined messages, or may move to folder based on who the conversation is delegated to, or may provide user override option so user may choose the folder (e.g. project name instead of who it was delegated to.

System may provide option to place conversations to sideline automatically based on system wide configuration or user specific configuration.

System may put a conversation on sideline based on various configurable filters such as: how long user ignores conversation, how many messages were opened, if message is high priority, if message is not from list of important senders, if user is not on TO line in address list, etc.

For example one user can set up auto sideline filter like this: "place conversation automatically on sideline if I open just a couple of messages in the conversation in 30 minutes, but I have been opening other messages during this time." Another user may set up filter like this: "place conversation automatically on sideline if messages are not flagged important, conversations are not originated by anyone on my VIP list, and I am not on TO-List, and I have opened up to 2 messages in 30 minutes while I was actively using email."

System may run one or more sideline processes which may monitor user activity and automatically sense conversations that need to be put on backburner.

Messages that are put automatically on sideline may be distinguished from messages intentionally placed on backburner using a different icon, or letter. (e. g. auto sideline can be indicated as "userw@acme.com$^S$" and intentional backburner may be indicated as "userw@acme.com$^S$").

Redirect Conversation Feature

This feature may be used in cases such as this: (a) upon receiving an email, user realizes that sender has picked his/her email address by mistake, e.g. due to similarity in name, etc. (b) a user—who is recently transferred to another department—gets an email pertaining to his/her old responsibility and wants to redirect the conversation, i.e., this email, other emails, and any future emails, (c) After a few email exchanges, the user realizes that there is another person more appropriate to handle the issue, and wishes to redirect the conversation to that person.

Upon invocation of command the system may allow user to select or enter one or more email addresses and click redirect. When the redirect command is executed, user's intention may be saved in a database meant for this purpose, and all messages in users Inbox pertaining to the same conversation may be forwarded to the selected email address(es)—provided they are not part of the recipient yet. A standard text such as "This conversation is redirected to you by, etc." may be added in the forwarded message. Any messages received after this action may not be forwarded automatically, as senders of future messages may remove other participants intentionally.

Email clients used by other participants of the said conversation may be able to query the shared data store and may display the status of conversation participants who have redirected the message in multiple ways based on his or her preferences. E.g. the redirecting participant may have an R super script next to it, the redirecting participant addresses/names may be struck out, redirected participant address/name may have F superscript, (e.g. "userw@acme.com$^R$", "userf1@acme.com$^F$", "userf2@acme.com$^F$"), participant name/address may have a specific background/foreground color, may be in different font, and so on.

Also, the client programs may automatically include redirected participants' addresses/names. The responder may have a choice of controlling new participants by removing their names. Depending on implementation, care must be taken to also remove name of the user who has redirected the message so the message does not rebound to unintended participant. This may be achieved using any suitable technique including flagging the shared data store appropriately to stop rebounding, or by warning the sender of unintended consequence, etc. Furthermore, should another participant include a user who had redirected a conversation and has since been removed from the email conversation, the client software may indicate that the user they just added has opted to redirect the conversation to others. Email addresses/names of redirected parties may be re-introduced in the list to let the person know who may receive messages.

Participants may be offered ways to bring the users who have redirected the conversation back into conversation (themselves, or others) using appropriate user interface device based on preferred implementation designed by subject matter experts. E.g. user may be able to right click or touch redirected participant name/address to see a popup menu, and click on a command, an icon, etc. to remove redirection to bring user back into conversation. Such command may remove information from shared data store pertaining to redirection with appropriate information about who removed it.

To enable participants to have the latest information, redirect status may be refreshed responsive to messaging client events, for example, whenever a user opens a message, whenever the user chooses to respond to the message and starts composing it by clicking "Reply" or "Reply all", and when the user chooses to send it. If more users have redirected conversation between reply and send commands, the client software may alert user of such change and provide the option to proceed or make any changes to address list. Some implementers may optionally refresh list periodically to increase correctness of address list.

When a user chooses to go on sideline using appropriate user interface (click, touch, gesture, voice, etc.) a dialog may pop up, or other suitable user interface element may be presented, which may ask the user additional information to enhance functionality further. Such additional information may include:

a) Reason for redirecting

System may ask user to pick a reason. There may be a list of standard reasons for the user to pick from, and in addition, a way for user to provide custom reason not included in the standard list. The system may display this reason to conversation participants with appropriately designed user interface feature by the subject matter expert, e.g. one way is to show it with mouse-over event on the user's name in list; another way is to show when user right clicks on name/address along with command to bring user back into conversation; with smart phones and tablets finger hover may be used, etc. This reason may also be included in the message that is forwarded to the redirected users.

b) Ability to customize message to the redirected message recipient

System may offer user options to add a message different from the reason above to be included in forwarded messages.

c) Ability to customize how other messages in Inbox need to be treated when user redirects the conversation System may offer user options for treatment of other messages pertaining to the same conversation in Inbox from various options such as, redirect messages that are unread, or redirect all messages in the conversation, read or unread, or redirect only the current message and any future messages, etc. System may also offer to remember user's choice as default for the next time around and use it as default for future requests by the user.

d) Choice for how to dispose redirected messages for this conversation

System may allow the user to pick from multiple options, such as: delete after redirecting messages, move them to a specific folder, which the user can choose, or leave them in the Inbox, etc.

e) Set authorization for who can see user has redirected messages

System may offer user to set security option to choose who can see that the conversation was redirected, e.g., show the status to internal participants sharing same domain, or participants belonging to custom group, e.g., my colleagues and my manager, etc. Such option may be useful when user does not want to offend an important client by telling them their messages were redirected.

Withdraw from Conversation Feature

This feature may be used in cases similar to the ones for redirection need, but the recipient either does not know who to redirect the message, or concludes that all people who he could have redirected the messages to are already included in address list.

Upon invocation of command, user's intention may be saved in a database meant for this purpose, and all messages in users Inbox pertaining to the same conversation may be moved to a folder designated for such purpose. Any messages received after this action may also be moved to the same folder, as long as the user's withdrawn status is not removed by any of the participants from the shared data store.

The message moving part of this feature may be implemented in client software, or middleware software, or email server, or by an independent program, which runs periodically to detect these situations.

Email clients used by other participants of the said conversation may be able to query the shared data store and may display the withdrawn status to other participants in multiple ways based on user interface designer's preference. E.g. the participant may have an W super script next to it, the participant addresses/names may be struck out, (e.g. "userw@acme.com $^{W}$") participant name/address may have a specific background/foreground color, may be in different font, and so on.

Also, the client programs may automatically exclude withdrawn participants' email addresses/names. Furthermore, should another participant include a user who had withdrawn from the conversation and has since been removed from the email address list, the client software may indicate that the user they just added has opted to withdraw the conversation in a manner consistent as when users name was not removed from address list.

Participants may be offered ways to bring the users who have withdrawn from the conversation back into a conversation (themselves, or others) using appropriate user interface device, based on preferred implementation designed by subject matter experts. Undoing withdrawal needs an "Add" feature described next, because there may be several email messages not carrying the added user's email address, and the user may miss part of conversation if participants keep using reply all to messages that do not have this user's email address.

So as to enable participants to have the latest information, withdraw status may be refreshed responsive to messaging client events, for example, whenever user opens a message, whenever user chooses to respond to the message and starts composing it by clicking reply or reply-all, and when the user chooses to send it. If more users have withdrawn conversation between reply and send commands, the client software may alert user of such change and ask if user wishes to proceed, or wishes to make any changes to address list. Some implementers may optionally refresh list periodically to increase correctness of address list.

When a user chooses to go on withdraw from a conversation using appropriate user interface (click, touch, gesture, voice, etc.) a dialog may pop up, or other suitable user interface element may be presented, which may ask the user additional information to enhance functionality further. Such additional information may include:

a) Reason for withdrawing

System may ask user to pick a reason. There may be a list of standard reasons for the user to pick from, and in addition, a way for user to provide custom reason not included in the standard list. The system may display this reason to conversation participants with appropriately designed user interface feature by the subject matter expert, e.g. one way is to provide a display with mouse-over event on the user's name in list; another way is to show when user right clicks on name/address along with command to bring user back into conversation; with smart phones and tablets finger hover may be used, etc. This reason may also be included in the message that is forwarded to the redirected users.

b) Ability to customize how other messages in Inbox need to be treated when a user withdraws from the conversation System may offer user options for treatment of other messages pertaining to the same conversation in Inbox from various options such as, delete messages, or move them to a folder, delete or move messages that are unread, or delete all messages in the conversation, or delete only the current message and any future messages, etc. System may also offer to remember user's choice as default for the next time around and use it as default for future requests by the user.

Add Users to Conversation Feature

This feature may be used in cases such as this: (a) upon receiving an email, or after a few email exchanges, a participant realizes that sender has not included some other participants.

In accordance with at least one embodiment of the invention, this feature works differently than the currently available features of just forwarding an email to the new user, or including a new user in one's reply-all. For example, these conventional techniques can cause new participant to potentially miss future emails in the conversation. This is because other users may reply-all to an old email in the thread, which does not have new participant's address in the address list. With new participant's address added in shared data store, the email client software can include a new user in the address list by referring to shared data store.

Also, with this feature when users are added, they may get an email without other users seeing "sharing . . . " type of email reducing emails received by old participants.

Upon invocation of command the system may allow user to select or enter one more email addresses and invoke the add command. Following the execution, user's intention may be saved in a database meant for this purpose, and all messages in users Inbox pertaining to the same conversation may be forwarded to the selected email address(es)—provided the users are already not on the email list for such messages. A standard text such as "You were added to this conversation, etc." may be added in the forwarded message.

In accordance with at least one embodiment of the invention, any messages received after this action are not forwarded automatically, as sender may have intentionally removed these participants.

The shared data store may record particular message ids, and new users who were added to conversation. This may be used by client programs to display who were sent which messages from conversation because of this feature, as assumption cannot be made that all messages from conversation may be sent to the new user as described in discussion about how reply-all should work in accordance with at least one embodiment of the invention.

Email clients used by other participants of said conversation may be able to query the shared data store and—based on designer's preference—may display new users who were added to the conversation, even though the email headers may not have the new user listed. This may let other users who wish to add same new participants know that they have been already added. E.g. newly added participant address/name may have "A" superscript, (e.g. "usera1@acme.com$^A$", "usera2@acme.com$^A$"), participant name/address may have a specific background/foreground color, may be in different font, and so on.

In accordance with at least one embodiment of the invention, when a user invokes reply-all, the newly added users which are not included in the email headers for recipient lists should be included and such inclusion should be highlighted—so that the sender would have opportunity to remove any users he/she does not want to send new message to.

So as to enable participants to have latest information, recipient lists may be refreshed responsive to messaging client events, for example, whenever a user opens a message, whenever user chooses to reply-all to the message, and when the user chooses to send it. Some implementers may optionally refresh lists periodically during a long compose time to increase correctness of recipient list.

When a user chooses this action a dialog may pop up, or other suitable user interface element may be presented, which may ask the user additional information to enhance functionality further. Such additional information may include:

a) Reason for redirecting

System may ask user to pick a reason. There may be a list of standard reasons for the user to pick from, and in addition, a way for user to provide custom reason not included in the standard list. The system may display this reason to conversation participants with appropriately designed user interface feature by the subject matter expert, e.g. one way is to show it with mouse-over event on the user's name in list; another way is to show when user right clicks on name/address along with command to bring user back into conversation; with smart phones and tablets finger hover may be used, etc. This reason may also be included in the message that is forwarded to the redirected users.

b) Ability to customize message to the added recipient

System may offer user options to add a message different from the reason above to be included in forwarded messages.

c) Ability to customize how other messages in Inbox need to be treated when user redirects the conversation System may offer user options for treatment of other messages pertaining to the same conversation in Inbox from various options such as, send messages that are unread, or send all messages in the conversation, read or unread, or send only the current message, etc. System may also offer to remember user's choice as default for the next time around and use it as default for future requests by the user.

d) Set authorization for who can see user has added other users to the messages

System may offer user to set security option to choose who can see that the conversation was redirected, e.g., show the status to internal participants sharing same domain, or participants belonging to custom group, e.g., my colleagues and my manager, etc. Such option may be useful when user does not want to offend an important client by telling them their messages were redirected.

Re-Invite User into Conversation

This feature may be used in cases such as this:

A user—such as a manager—after delegating responsibility to another and goes on sideline, but the participants of conversation need his input when they cannot figure how to proceed.

A user assumes a colleague may take care of an issue—goes on sideline, but when it is discovered by others that the colleague is on extended leave, they want to bring the user back into the conversation.

User goes on sideline by mistake, and wants to get back into conversation.

A user redirects conversation causing future emails to go to redirected parties, but other participants realize that user needs to participate in conversation A user withdraws from conversation thinking he/she does not need to participate, but other participants think that particular user participation is necessary.

When the "re-invite to conversation" command is invoked, this information may remove or invalidate user's state in the shared data store with regards to the present conversation. Consequently the program modules, which would have filtered or moved any messages related to conversation based on user's state in shared data store.

All participants may be offered ways to bring the users back into conversation (by themselves, or by others) using appropriate user interface device based on preferred implementation designed by subject matter experts. E.g. user may be able to right click or touch sideline participant's address in the recipient list to see a popup menu, and click on a command, an icon, etc. to bring user back into conversation.

When a user chooses to go on sideline using appropriate user interface (click, touch, gesture, voice, etc.) a dialog may pop up, or other suitable user interface element may be presented, which may ask the user additional information to enhance functionality further. Such additional information may include:

a) Reason for bringing user back from sideline

System may ask user to pick a reason. There may be a list of standard reasons for the user to pick from, and in addition, a way for user to provide custom reason not included in the standard list. The system may send an email to the affected user with the reason for re-invite.

Close Conversation Feature

This feature may save time for many users by removing messages related to conversations that are saved from inbox when conversations are closed. Such feature may be of particular help for users who come back to their email after an extended period—say after a couple of days of business trip or a week of vacation—because many of the messages that are no longer relevant may be already moved away, or filtered out from inbox view.

Upon invocation of command by one of the participants, "close conversation" command is executed and user's intention may be saved in a database meant for this purpose.

The feature can be implemented in multiple manners. Some examples are: An email client program may poll the shared data store every so often to see if any conversations are closed and then move all closed conversations to designated folder. Alternatively, messages may be left in the same folder, but may be hidden from inbox view unless the user asks for them. Instead of implementing in email client, the program may be implemented in middleware—the middleware—when asked to refresh inbox may do moving of messages to designated folder, or filtering of messages. The same may be done in email server program as well.

Additional features may include:

a) Reason for closing conversation

System may ask user to pick a reason. There may be a list of standard reasons for the user to pick from, and in addition, a way for user to provide custom reason not included in the standard list. The system may display this reason to conversation participants with appropriately designed user interface feature by the subject matter expert.

b) Send a closing message to all participants

As "messages vanishing suddenly from inbox" is not a good user experience, System may send a "Conversation closed" message with a standard text, or using text entered as reason for closure.

c) Ability for users to configure how closing messages are handled

Users may be given ability to configure how closed messages are to be treated. User may be able to specify if they should be moved to a specific folder, sorted to bottom of inbox, displayed in a separate tab, or just added to inbox like all the other messages, etc.

d) Allow workflow for closing conversation

System may allow email implementations to choose conditions for closing conditions. For example, when one user closes conversation, a proposal for closing may be sent to all participants, or active participants. If one of them concurs, conversation may be closed.

e) Sense common closing phrases and propose closure of conversation

System may sense common ways in which conversations are closed and then prompt the user if he/she would like to close conversation when message is sent. For example, if email text is very brief and has closing words like "thank you" System may sense the user may want to close the message. The system could also "learn" user's typical closing phrases avoid showing annoying popup messages as it learns. E.g., a checkbox with prompt may allow user to state not to treat this phrase as closing message in future.

Reopen Conversation Feature

This feature may allow participants to reopen a conversation, if it is closed by mistake, or if one of the participants does not agree with closing the conversation.

A user may be able to locate the closed conversation list, or look at conversation-closed message and invoke a command to reopen conversation.

The feature may be implemented in multiple manners. Some examples are: An email client program may poll the shared data store every so often to see if any conversations are reopened and if the closed messages are stored in a designated folder, they may be moved back to inbox, or if they were hidden from in box with a filter, they may no longer be hidden, etc. Instead of implementing in email client, the program may be implemented in middleware—the middleware, or email server. The implementation architecture can be decided by the architect experienced in the knowledge of art based on various factors suitable for the implementing team.

Additional features may include:

a) Reason for reopening conversation

System may ask user to pick a reason. There may be a list of standard reasons for the user to pick from, and in addition, a way for user to provide custom reason not included in the standard list. The system may display this reason to conversation participants with appropriately designed user interface feature by the subject matter expert.
b) Send a reopen message to all participants, or only to the participants who have read closure message When user thinks the conversation is closed, messages related to that conversation suddenly reappearing from inbox is not a good user experience, System may send a "Conversation reopened" message with a standard text, or using text entered as reason for reopen.

Prioritize for Self or Others Feature

Features exist to flag conversations as important for one, or for marking messages as important when one sends an email. The deficiencies noted in these instances are: (a) after message is sent, you cannot change priority—unless you resend message, (b) you cannot selectively make conversation high priority for some of the participants. (c) you cannot assign priority ranking so as to sort conversations.

This feature may allow users to mark messages with priority ranking, so the messages may be sorted by priority order. If messages arrive marked as high priority, but one of the users as one of the participants does not feel it is important for his or her purpose, user may opt to lower priority.

A manager, or triage person may also use this feature to elevate priority of conversations for selected participants.

The feature may also allow rules to define priority. For example, a user may set up rule as: if my manager has decided a conversation is high priority, and if I am on the to-list, make conversation high priority for me, too.

Users may be allowed to invoke command by using suitable user interface such as, touch the addressee in recipient list, or right click on the addressee and then select "set priority" and enter or pick a number. Interface may be defined in multiple other ways based on designer's preference. Upon invoking such command, the priority may be stored in shared data store, and may be available for others to see.

Additional features may include:
a) Ability to create rules based on priority set by others System may allow the rules engine in email programs to read priority set by others also allow it to change priority based on such data. Rules could not only be allowed to read priority, but also other metadata in the shared data store. For example, rule could sense that the manager has been interested in the conversation based on his or her reading and active participation in the conversation and then set priority accordingly.
b) Set authorization for who can see user System may offer user to set security option to choose who can see the priority changes. The system could offer this selectively to avoid offending other participants—for example show only elevated priorities to others.

Quiet Period Feature

Continuously arriving emails can cause disruption of work. Many people cannot easily ignore emails trickling in their Inbox. Switching between non-urgent email, and other work can waste time unnecessarily. This feature may allow users to setup "Quiet time" for themselves, or system wide Quiet times. This feature may stop any non-urgent emails during this period. Alternatively, or in addition, a user may "fine tune" the types of messages that may be received during a quiet period, for example, utilizing quite period exception rules.

A user may be able to set Quiet time in a manner similar to calendar feature offered by most email clients. The client may not poll email server during the time period marked as Quiet.

Additional features may include:
a) Allow urgent messages to pass through during Quiet period Email client may poll messages during Quiet time, but only bring back messages marked urgent.
b) Allow users to see that recipients are in Quiet mode and adjust urgency of message When a user composes or replies to email and constructs address list, the email client may query shared data store and let the user know—using appropriate user interface device such as color, icon, or a message—that some of the recipients have set Quiet period. The user composing the message then could choose to request urgent delivery. This information may be passed to other email clients in multiple ways: for example, it could be included in a custom header, or message could be marked urgent using commonly used email header, or information may be noted in the shared data store. Other email clients may then sense such messages as urgent and bring to inbox even in Quiet period.
c) Allow user to configure which messages should be delivered during Quiet period User may be allowed to set rules such as quiet period exception rules. For example a marketing person may set that any emails from external clients be allowed to pass through in Quiet period, or a user may set a rule that emails from set of email addresses (manager, spouse) should pass through, etc. As well as particular senders and/or types of sender, particular conversations and/or types of conversation may be designated as an exception to quiet mode. For example, messages associated with "followed" conversations and/or senders may be accepted during quiet mode.

Sender's Review Feature

Many people are in habit of replying to all without checking the TO and CC lists carefully. In addition, as this invention allows participants to go on sideline, or to withdraw, there is a risk that a sender may not realize the participants they are addressing are not going to receive the message. This feature may provide senders opportunity to review recipient list, their current status and adjust it appropriately.

When a user chooses to send a message, a notification may be presented to the sender—for example a popup window. Notification may have a list of participants, depending on which features are implemented in the embodiment—their current status pertaining to conversation, for example, information about whether they are on sideline, or have withdrawn, redirected it, etc. The information about whether participants are currently in quiet mode may also be presented (if implemented).

The sender may be offered features to re-invite participants who are not participating currently, and selectively mark messages for particular participants, to override participants' status and deliver this particular message in their inbox irrespective of conversation participation status.

Sender's Checklist Feature

Many people are in habit of replying to all without checking the TO and CC lists carefully. In addition, as this invention allows participants to go on sideline, or to withdraw, there is a risk that sender may not realize the participants they are addressing are not going to receive the message. This feature may provide senders opportunity to review recipient list, their current status and adjust it appropriately.

There are multiple aspects of sender's checklist functionality that may be implemented independent of each other. Implementing any one of them may be covered by this invention.

Review and Adjust TO, CC, and BCC Lists

When a user chooses to send a message, a notification may be presented to the sender—for example a popup window. Notification may have a list of participants, and user may have opportunity to change TO, CC, and BCC status for each recipient.

Review and Override Delivery of Message Irrespective of Participants' Status

When a user chooses to send a message, a notification may be presented to the sender—for example a popup window. Notification may have a list of participants, depending on which features are implemented in the embodiment—their current status pertaining to conversation, for example, information about whether they are on sideline, or have withdrawn, redirected it, etc. The information about whether participants are currently in quiet mode may also be presented (if implemented).

The sender may be offered features selectively mark messages for particular participants to deliver current message in their inbox irrespective of their current status for quiet mode, or for conversation.

Review and Participants' Status and Re-Invite them

The sender may be offered features to re-invite participants who are not participating currently in the current conversation.

Review Participants' and Specify What is Expected

The sender may be offered features to specify, for each participant, what is expected. For example, "Action is needed", "Must read", "FYI", "OK to ignore", etc.

This information may be made available to the recipient when message is delivered.

The system may adjust TO and CC lists automatically based on what sender specifies. For example, "Action is needed" and "Must read" may result into TO list, whereas "FYI", and "OK to Ignore" may result in CC list.

The system may "OK to Ignore" messages may be moved to sideline folder, but may still be shown in conversation thread.

The system may retrieve participant's unavailability recorded in the email system and display it to the sender, so that sender is able adjust assignment of tasks.

The system may allow sender to specify due date for the tasks.

The system may create tasks in user's to-do lists, reminders, or task-list as appropriate.

Implementation Examples

Figure 4:
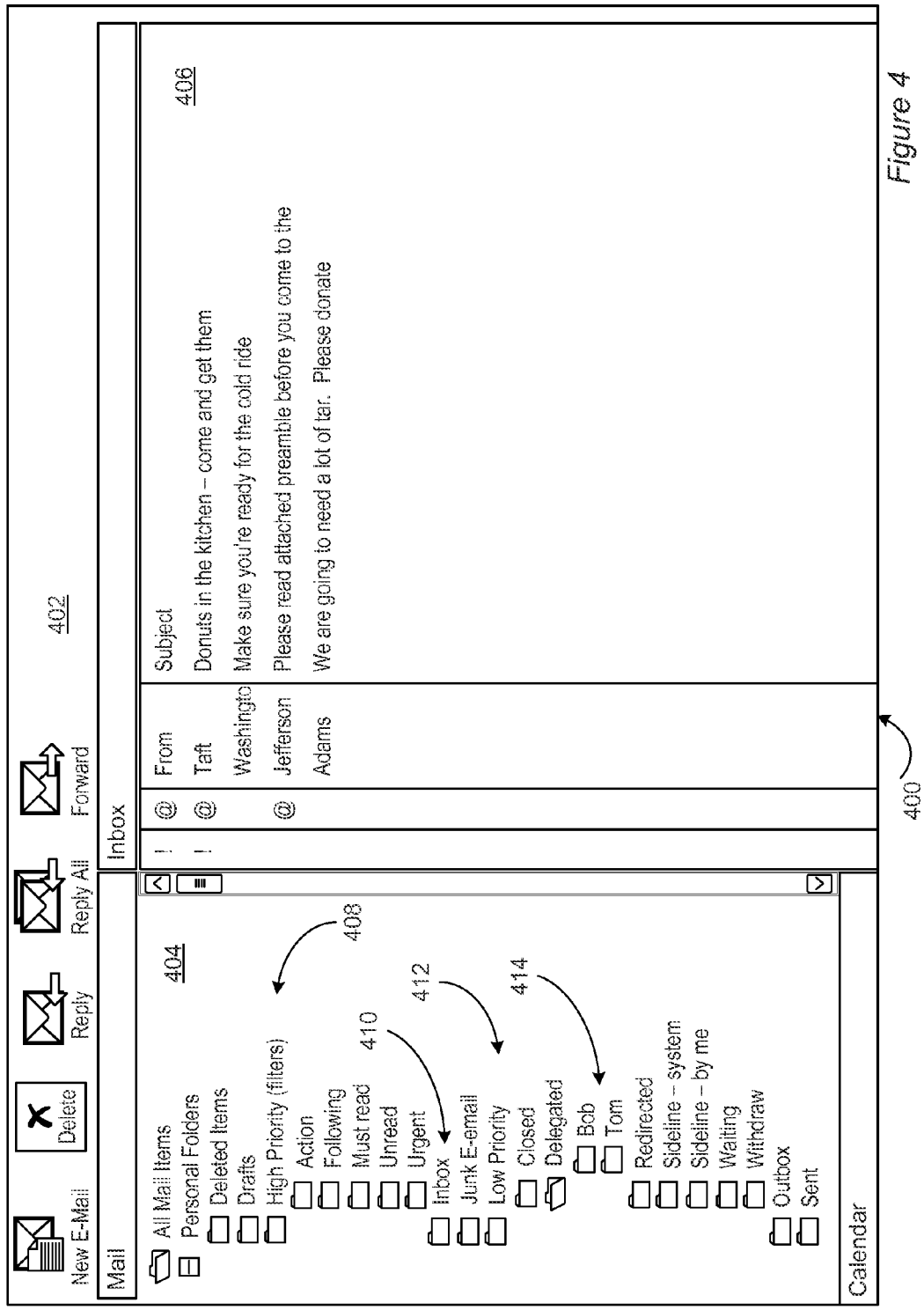
FIG. 4 is a user interface diagram depicting aspects of an example graphical user interface in accordance with at least one embodiment of the invention.

FIG. 4 depicts aspects of an example graphical user interface 400 in accordance with at least one embodiment of the invention. The example graphical user interface 400 includes a messaging control toolbar 402, a region displaying a messaging folder hierarchy 404, and a region displaying messaging folder content 406. The messaging folder hierarchy 404 may include a "High Priority" sub-hierarchy 408 with multiple search-type subfolders (e.g., similar to a conventional "unread" folder). Messages from an inbox 410 of a user may be filtered and displayed here 408. To enable filtering, messages may be marked upon arrival. For example, High Priority 408 subfolders may include "Action," "Following," "Must read," "Unread," and "Urgent." The "Following" subfolder may include conversations that the user has chosen to follow. Some messages may show in multiple search folders, e.g., a same message may be show in each of the Action, Unread and Following subfolders.

The message folder hierarchy 404 may further include a "Low Priority" sub-hierarchy 412 with multiple actual-type subfolders (e.g., holding authoritative instances of messages, rather than mere copies or references). Messages may be moved here 412 based on conversation statuses. Low Priority 412 subfolders may include "Closed," "Delegated," "Redirected," "Sideline—system," "Sideline—by me," "Waiting" and "Withdraw." The Waiting folder may hold non-urgent messages that are destined for the user's inbox once a user has exited "quiet mode." The Delegated subfolder may have subfolders of its own 414 corresponding to delegates.

Figure 5:
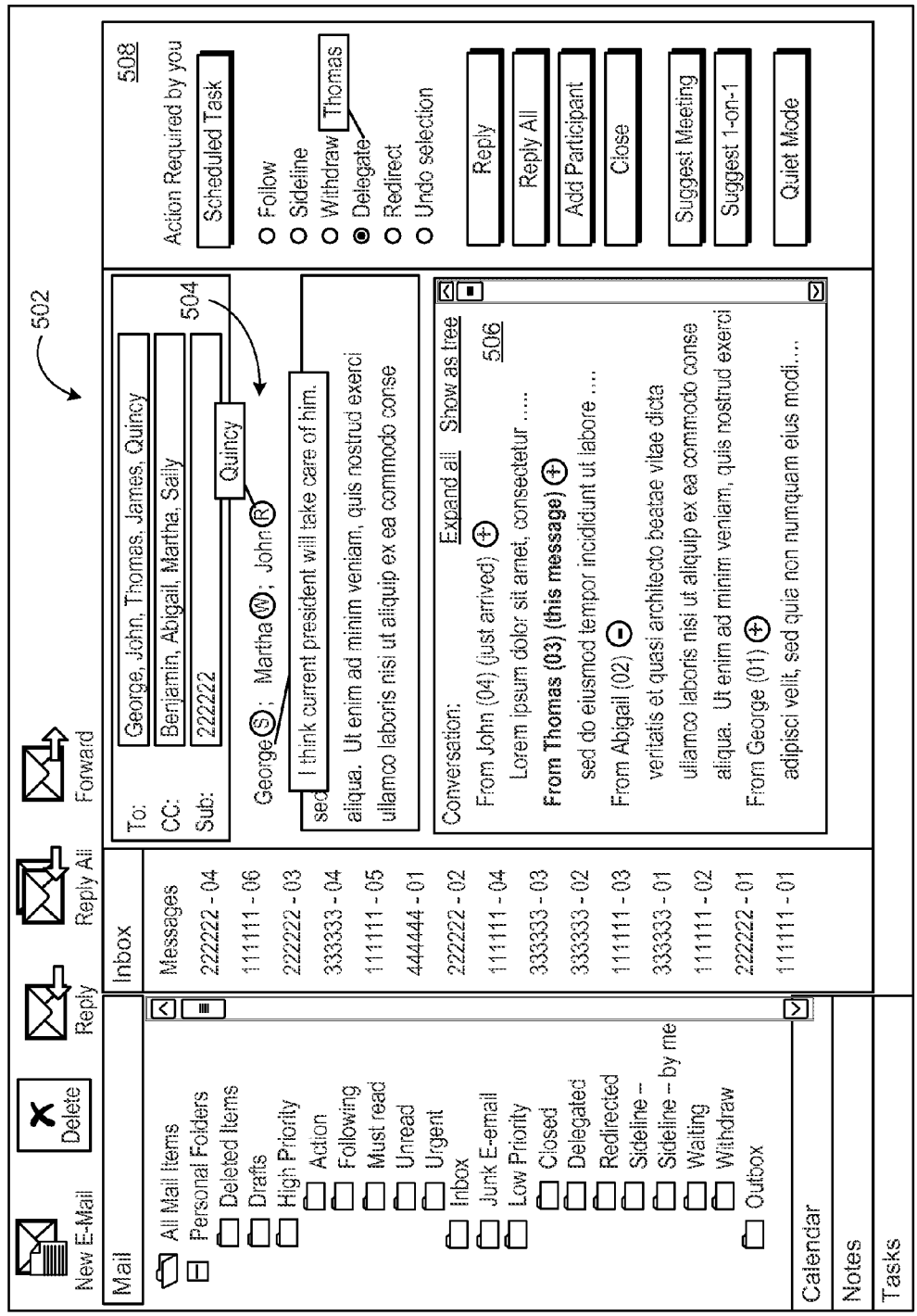
FIG. 5 is a user interface diagram depicting aspects of an example graphical user interface in accordance with at least one embodiment of the invention.
Figure 6:
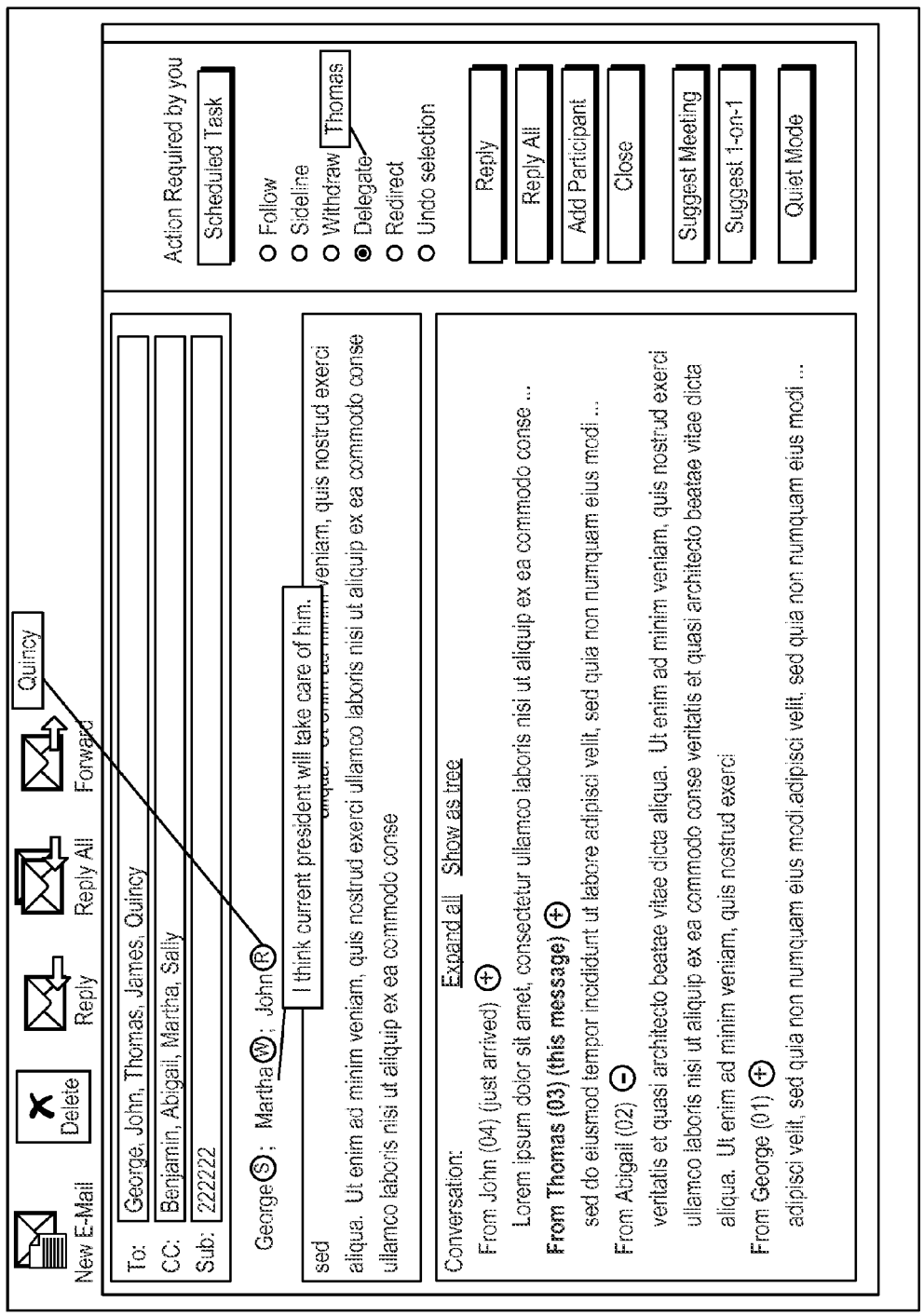
FIG. 6 is a user interface diagram depicting aspects of an example graphical user interface in accordance with at least one embodiment of the invention.

FIG. 5 depicts aspects of an example graphical user interface 500 in accordance with at least one embodiment of the invention. The example graphical user interface 500 includes a conversation manger region 502. The conversation manager region 502 includes conversation status indicators 504. For example, a conversation status indicator may be associated with each conversation participant. Conversation status indicators 504 may be responsive to user interest. For example, a user may express interest in a conversation status indicator by moving a mouse pointer over the conversation status indicator. A conversation status indicator corresponding to a "Redirected" status may display a name of a user to who the conversation was redirected, for example, in response to an expression of user interest (user "Quincy" is the depicted target of the redirect in FIG. 5). For example, the name may be displayed in a pop-up window or balloon window. If a conversation status reason has been set. The conversation status response may be displayed responsive to user interest. The conversation manager region 502 may also include a conversation presentation region 506 and a conversation control region 508. The conversation presentation region 506 may automatically refresh when new messages arrive. When options are selected in the conversation control region 508, the options may display additional information responsive to user interest. For example, delegate and redirect options may display a target user of the delegate or redirect. Once a conversation status option has been selected, the conversation control region 508 may display an "undo" option to remove the current conversation status. FIG. 6 depicts aspects of an example graphical user interface 600 in accordance with at least one embodiment of the invention. The example graphical user interface 600 is an alternative presentation of the example graphical user interface 500 of FIG. 5.

Figure 7:
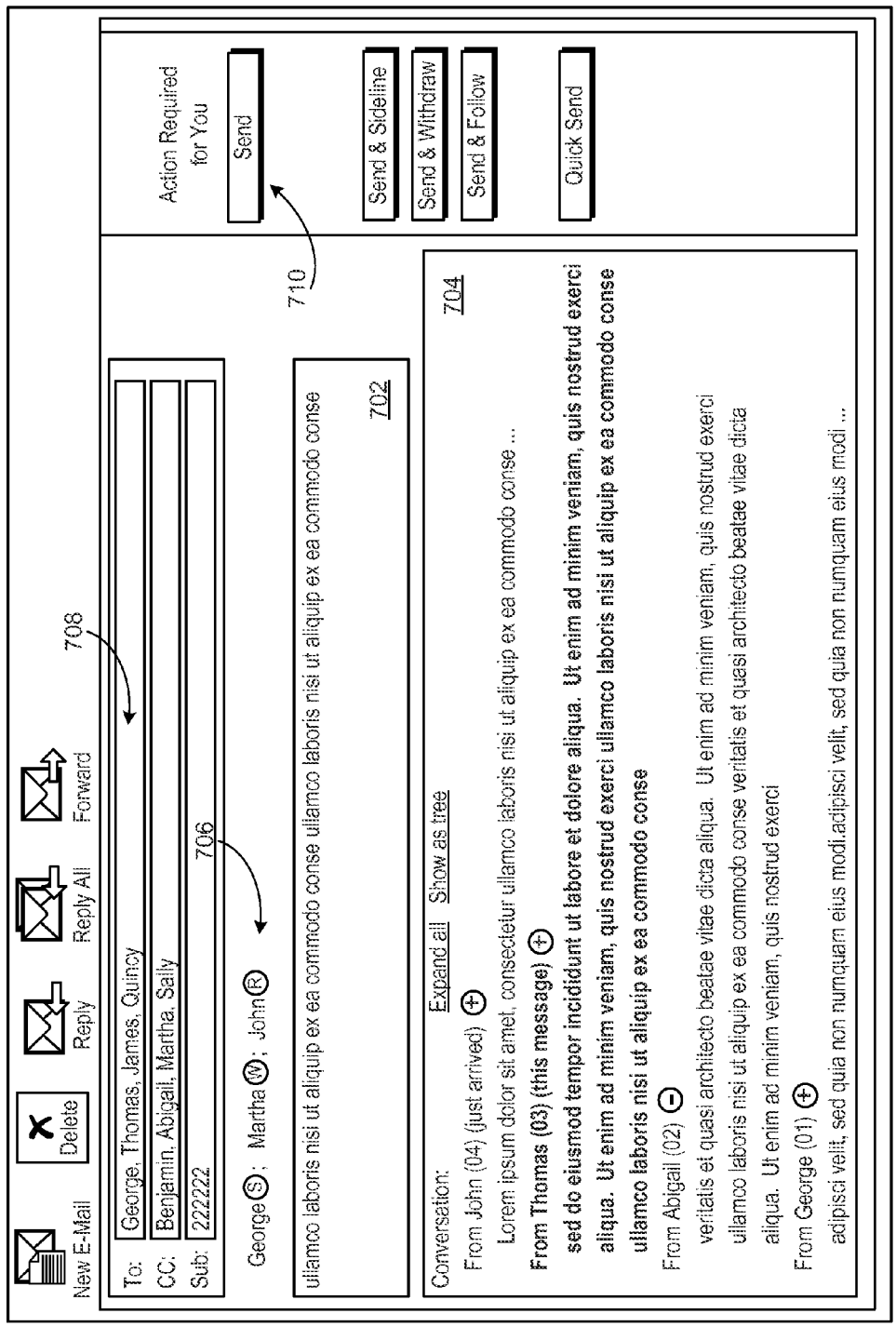
FIG. 7 is a user interface diagram depicting aspects of an example graphical user interface in accordance with at least one embodiment of the invention.

FIG. 7 depicts aspects of an example graphical user interface 700 in accordance with at least one embodiment of the invention. The example graphical user interface 700 includes a conversation participation region 702, a conversation presentation region 704 and a set of conversation status indicators 706. The conversation participation region 702 may be an expanding window into which a user enters text that becomes part of a conversation, e.g., a reply to text entered by another user. The conversation presentation region 704 may automatically refresh when new messages arrive. User "John" has a "Redirect" conversation participation status. Consequently, John is not listed in an address list 708 (e.g., the "To:" field) of the conversation. User "John" has redirected the conversation to user "Quincy". Consequently, Quincy is listed in the address list 708 even though Quincy was not initially a participant and may have been unaware of the existence of the conversation. If desired, the sender may remove the newly added user "Quincy" (or any other user) from the address list 708.

Figure 8:
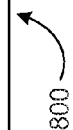
FIG. 8 is a user interface diagram depicting aspects of an example graphical user interface in accordance with at least one embodiment of the invention.

FIG. 8 depicts aspects of an example graphical user interface 800 in accordance with at least one embodiment of the invention. The example graphical user interface 800 may include a sender's checklist that is displayed responsive to user interaction with a send action user interface element (e.g., a send button). In this example 800, Thomas and James are in quiet mode. The sender desires to "break" Thomas' quiet mode (e.g., force Thomas to exit quiet mode and view a conversation element), but not James' quiet mode, although the message is "must read" for James. Benjamin is on sideline, and Sally has withdrawn. Sender may override this by clicking Action/Must Read. In this example, Benjamin was not on sideline during compose mode (e.g., during FIG. 7), but his conversation participation status has changed and been updated in the user interface 800 to reflect the change. In accordance with at least one embodiment, status information displayed in the sender's checklist is based at least in part on one or more permissions associated with the sender and/or a user group to which the sender belongs. For example, the sender and/or user group may have conversation status read permissions with respect to other conversation participants and/or associated user groups. Such permissions can be different for each conversation participant and/or associated user group, and may be maintained by an administrator and/or authorized delegate. Similarly, the sender and/or user group may have conversation status edit permissions with respect to other conversation participants and/or associated user groups. Conversation status edit permission may enable the sender to modify a current conversation status of other conversation participants.

With a sender's checklist 802, a sender may check who needs to take action, for whom a message is urgent, and so on, before sending. By default, being listed in a "To" or "CC" field of a message may correspond to a For Your Information (FYI) conversation participation status. Responsive to an "Urgent" conversation participation status setting, a targeted user's messaging identifier (e.g., email address) may be moved to the "To" and a new "X-UR" header of the conversation and/or an associated message. Upon receipt, sideline, withdrawn and/or quiet mode statuses may be overridden. Responsive to an "Action" conversation participation status setting, a targeted user's messaging identifier (e.g., email address) may be moved to the "To" and a new "X-AR" header of the conversation and/or an associated message. Upon receipt, sideline and/or withdrawn statuses may be overridden. Responsive to a "Read" or "Must Read" conversation participation status setting, a targeted user's messaging identifier (e.g., email address) may be moved to the "To" and a new "X-MR" header of the conversation and/or an associated message. Upon receipt, sideline and/or withdrawn statuses may be overridden. Responsive to an "FYI" conversation participation status setting, a targeted user's messaging identifier (e.g., email address) may be moved to the "CC" and a new "X-FYI" header of the conversation and/or an associated message. Responsive to an "JIC" conversation participation status setting, a targeted user's messaging identifier (e.g., email address) may be moved to the "CC" and a new "X-JIC" header of the conversation and/or an associated message. Upon receipt, the conversation and/or associated message may be moved to the targeted user's JIC folder and/or shown in a conversation window such as the conversation presentation region 704 of FIG. 7. Responsive to a "Remove" conversation participation status setting, a targeted user's messaging identifier (e.g., email address) may be removed from the "To" and/or "CC" headers of the conversation and/or an associated message. Although example header names such as "X-UR", "X-AR", "X-MR", "X-FYI" and "X-JIC" are used herein for clarity, any suitable header name may be utilized. Alternatively, or in addition, corresponding information may be incorporated into any suitable non-header message field in accordance with any suitable messaging protocol including standard, extended and customized messaging protocols.

Figure 9:
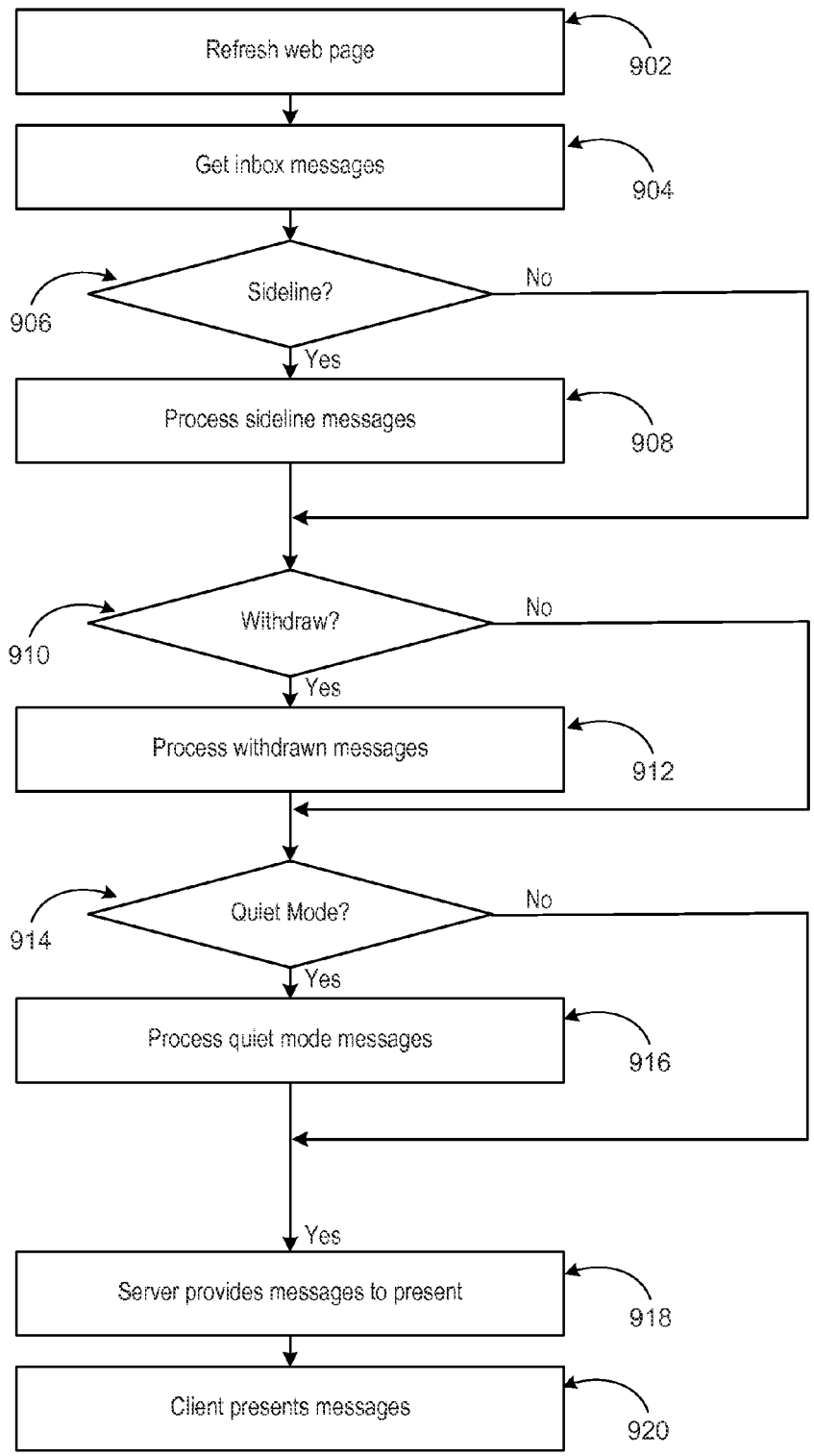
FIG. 9 is a flowchart depicting aspects of an example procedure in accordance with at least one embodiment of the invention.

FIG. 9 depicts aspects of an example procedure for user requests to see inbox (Thin Client Version) in accordance with at least one embodiment. User selects a command resulting in refresh of web page showing inbox (at 902). Client program calls server to get list of messages in inbox (at 904). If embodiment implements sideline feature (check at 906), server program(s) refer to shared data store and check if any messages in the inbox belong to conversations where present user is on sideline and moves such messages to designated sideline folder—excepting any messages where sender has overridden sideline for the present user (at 908). If embodiment implements withdraw feature (check at 910), server program(s) refer to the shared data store to check if any messages belong to conversations from which the present user has withdrawn. If so, server program(s) will move these messages to designated withdraw folder—excepting any messages where sender has overridden withdraw for the present user (at 912). If embodiment implements quiet mode (check at 914), server program(s) checks to see if the user is currently in quiet mode. If yes, it moves unread messages arrived after the last read message to designated holding folder excepting any messages where sender, recipient, system administrator and/or authorized delegate thereof has overridden and/or established exceptions to quiet mode for the user (at 916). Server side program builds a list of appropriate messages from inbox, based on page size, current page number, sort order, filter, etc. It then returns this information to the client side program (at 918). Client side program receives this information and displays the messages in desired format (at 920).

Figure 10:
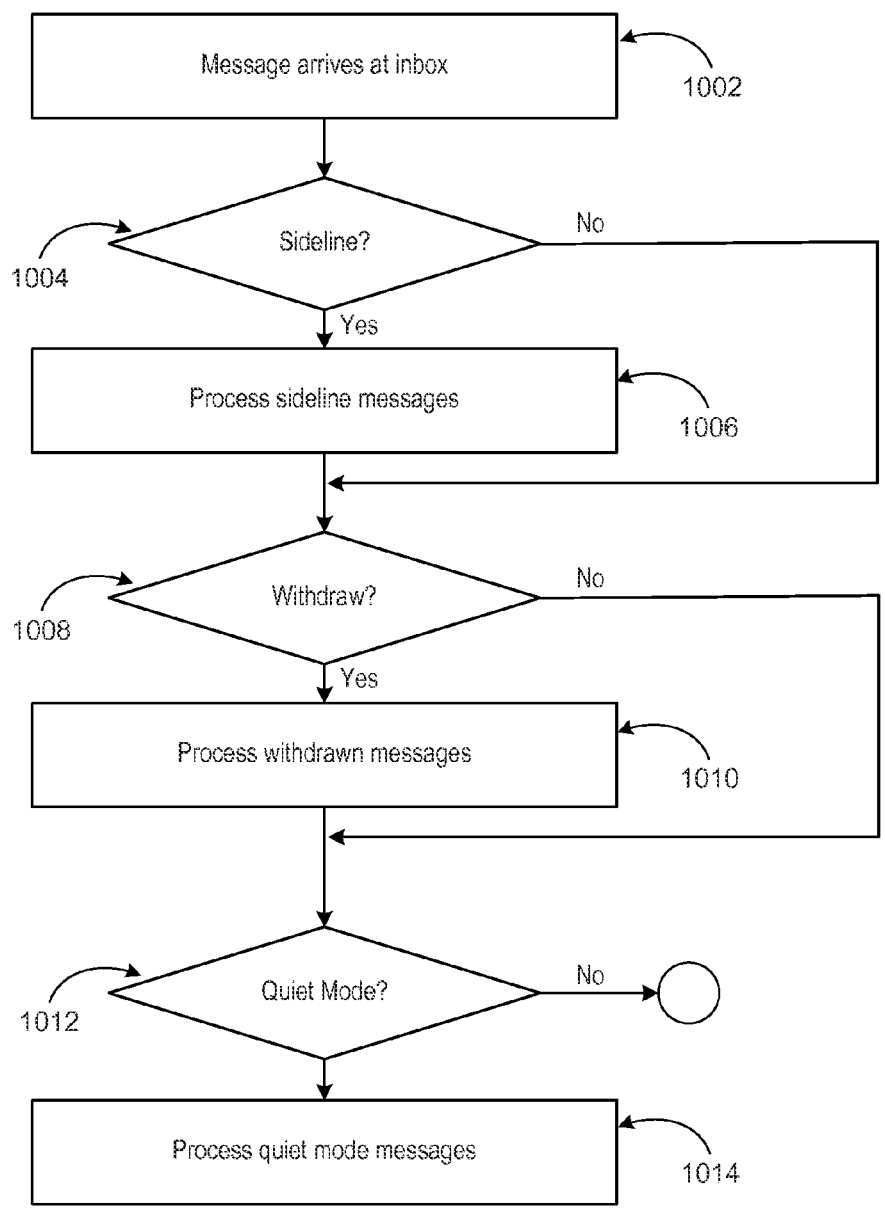
FIG. 10 is a flowchart depicting aspects of an example procedure in accordance with at least one embodiment of the invention.

FIG. 10 depicts aspects of an example procedure for message arrives in inbox (Thick Client Version) in accordance with at least one embodiment. A new message arrives in inbox (at 1002). If embodiment implements sideline feature (check at 1004), client program or a plug-in program refers to shared data store and checks if the arrived message belongs to a conversation for which the present user is on sideline. If so, and if message is not marked for overriding sideline for the present user by the sender, it moves the message to designated sideline folder (at 1006). If embodiment implements withdraw feature (check at 1008), client program or plug-in program refers to the shared data store and checks if the arrived message belongs to a conversation from which the user has withdrawn. If so, and if message is not marked for overriding withdraw for the present user by the sender, it moves the message to designated withdraw folder (at 1010). If embodiment implements quiet mode (check at 1012), client program checks to see if the application is currently in quiet mode. If yes, and if the message is not marked urgent, it moves the message to a holding folder (at 1014).

Figure 11:
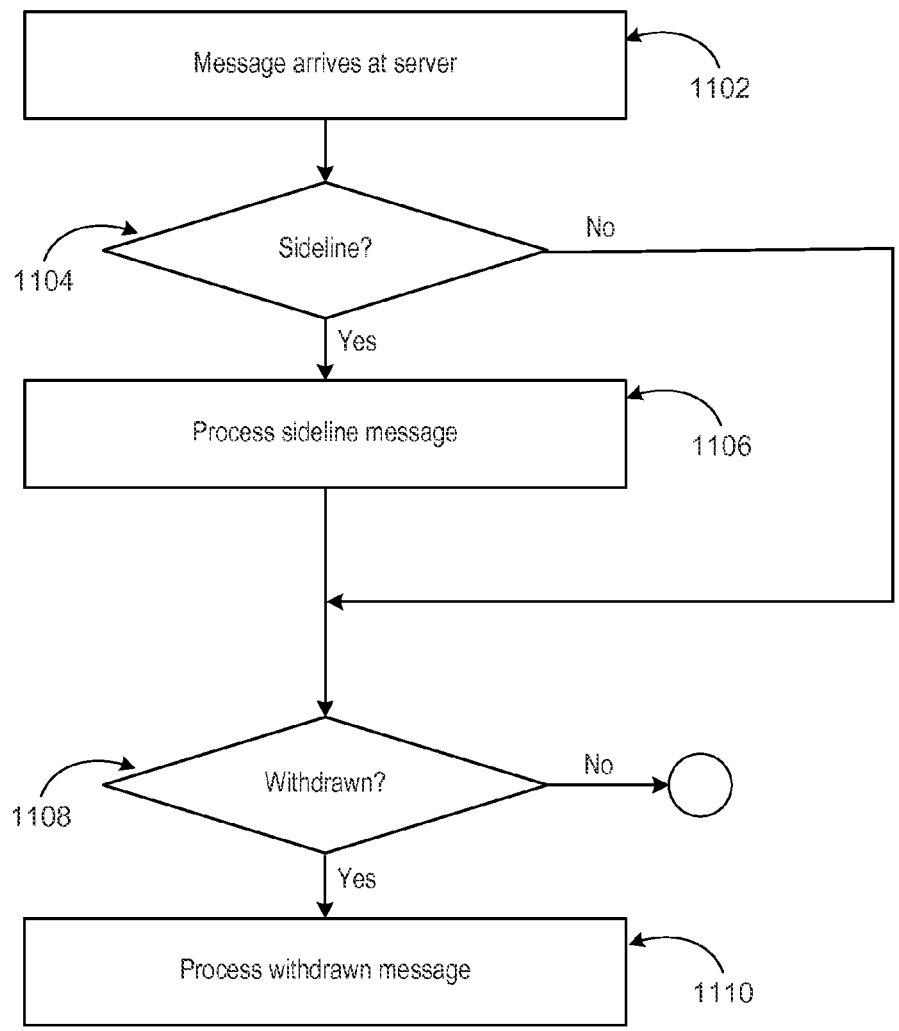
FIG. 11 is a flowchart depicting aspects of an example procedure in accordance with at least one embodiment of the invention.

FIG. 11 depicts aspects of an example procedure for message arrives in inbox (Email Server Version) in accordance with at least one embodiment. A new message arrives in mailbox at the email server (at 1102). Mail server program (or its component) refers to the shared data store to check (at 1104) if the arrived message belongs to a conversation on sideline and determines which sideline folder is designated for the conversation. If user has put the conversation on sideline, it moves the message to appropriate folder corresponding to the conversation (at 1106). Mail server program or its component refers to the shared data store and checks (at 1108) if the arrived message belongs to a conversation from which the user has withdrawn. If so, it deletes the message (at 1110).

Figure 12:
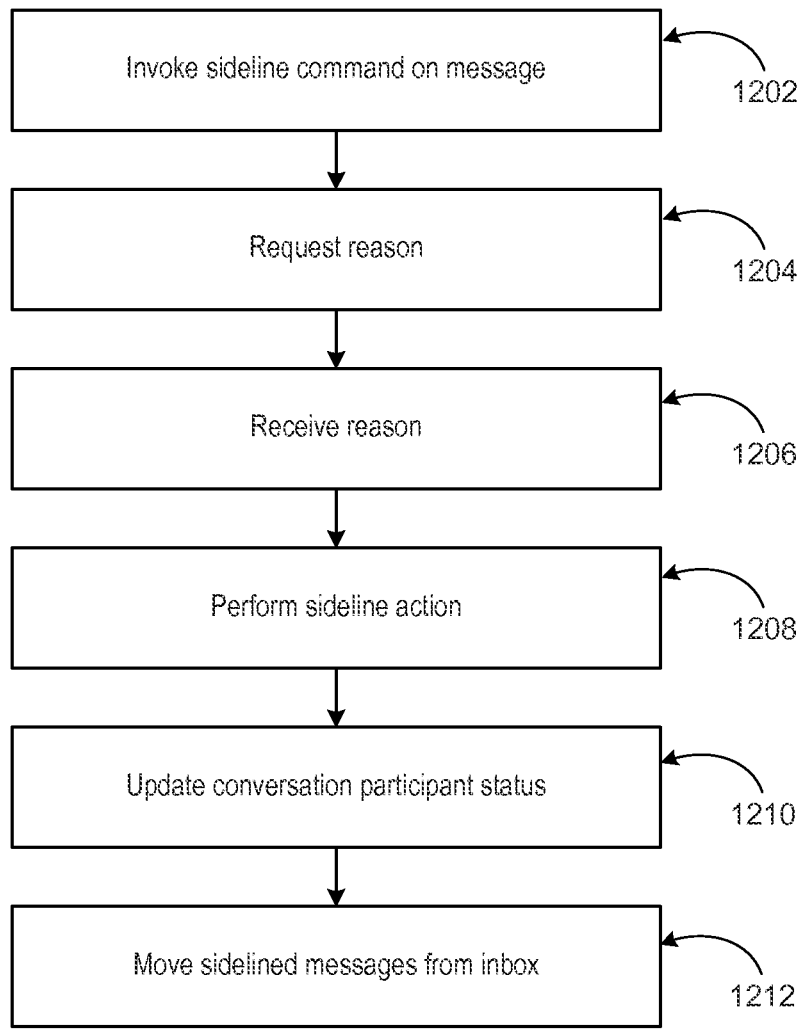
FIG. 12 is a flowchart depicting aspects of an example procedure in accordance with at least one embodiment of the invention.

FIG. 12 depicts aspects of an example procedure for user puts conversation(s) on sideline (thin client version) in accordance with at least one embodiment. User selects one or more messages and invokes sideline command (at 1202). Client program asks the user to enter a reason (at 1204). User provides the information and chooses to proceed (at 1206). Client program calls the server program to perform the sideline action. It sends list of message id(s) or conversation id(s), and other information provided by the user to the server program (at 1208). Server program(s) update the shared data store to record user's preference to put specified conversation(s) on sideline along with reason (at 1210). Server side program(s) moves all messages in the inbox for specified conversation(s) from user's inbox folder to designated sideline folder (at 1212).

Figure 13:
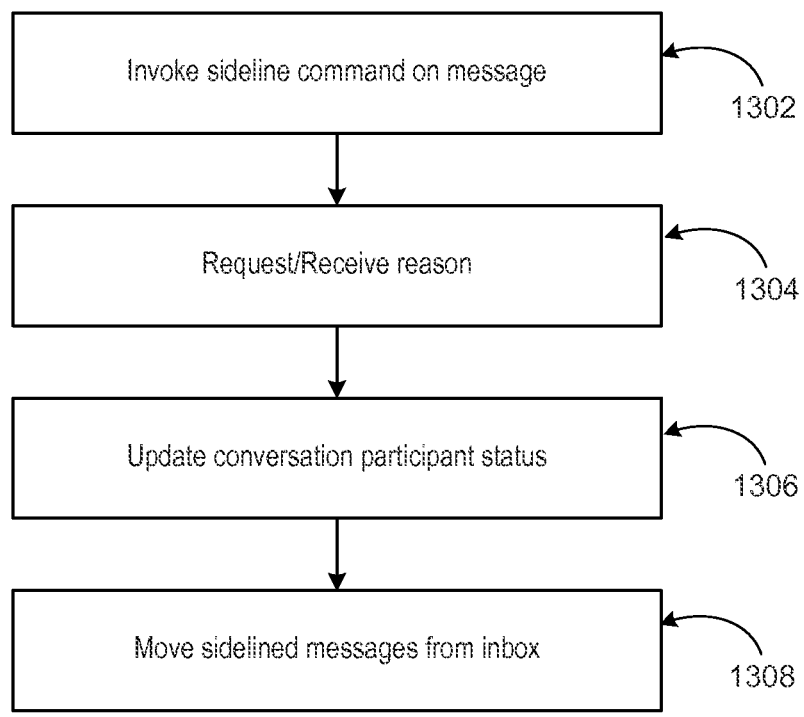
FIG. 13 is a flowchart depicting aspects of an example procedure in accordance with at least one embodiment of the invention.

FIG. 13 depicts aspects of an example procedure for user puts conversation(s) on sideline (thick client version) in accordance with at least one embodiment. User selects one or more messages and invokes sideline command (at 1302). Client program asks user to enter reason. User provides the information and continues (at 1304). Client program updates the shared data store to record user's preference to put specified conversation(s) on sideline along with reason (at 1306). Client program moves all messages in the inbox for specified conversation(s) from user's inbox folder to corresponding folder (at 1308).

Figure 14:
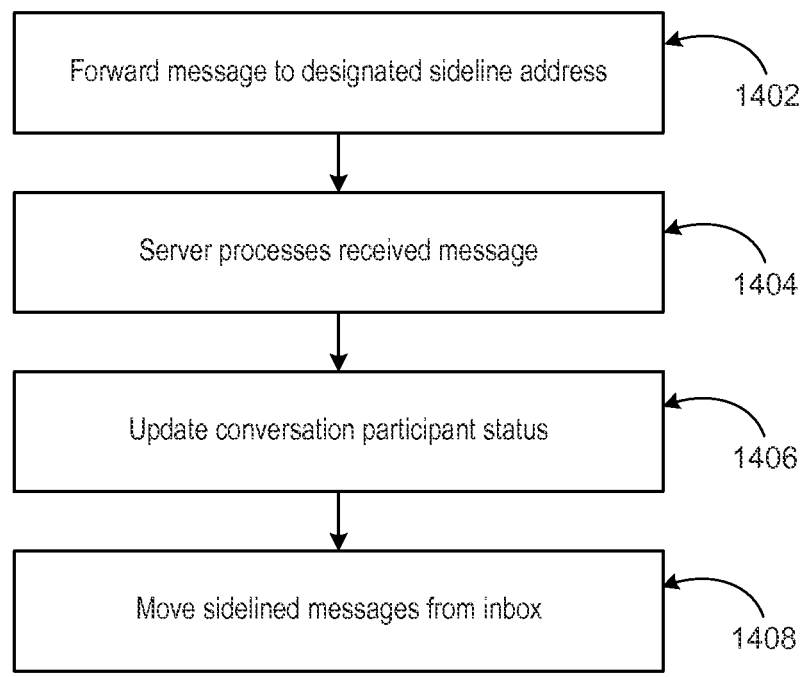
FIG. 14 is a flowchart depicting aspects of an example procedure in accordance with at least one embodiment of the invention.

FIG. 14 depicts aspects of an example procedure for user puts conversation(s) on sideline (email interface version) in accordance with at least one embodiment. User selects one or more messages and forwards them to a designated address such as sideline@mycompany.com. User enters reason in email body (at 1402). Server program(s) reads messages received by designated email address. It extracts information such as conversation id, who sent the request, reason etc. from email message and headers (at 1404). Server program(s) update the shared data store to record user's preference to put specified conversation(s) on sideline along with reason (at 1406). Server side program(s) moves all messages in the inbox for specified conversation(s) from user's inbox folder to designated sideline folder (at 1408).

Figure 15:
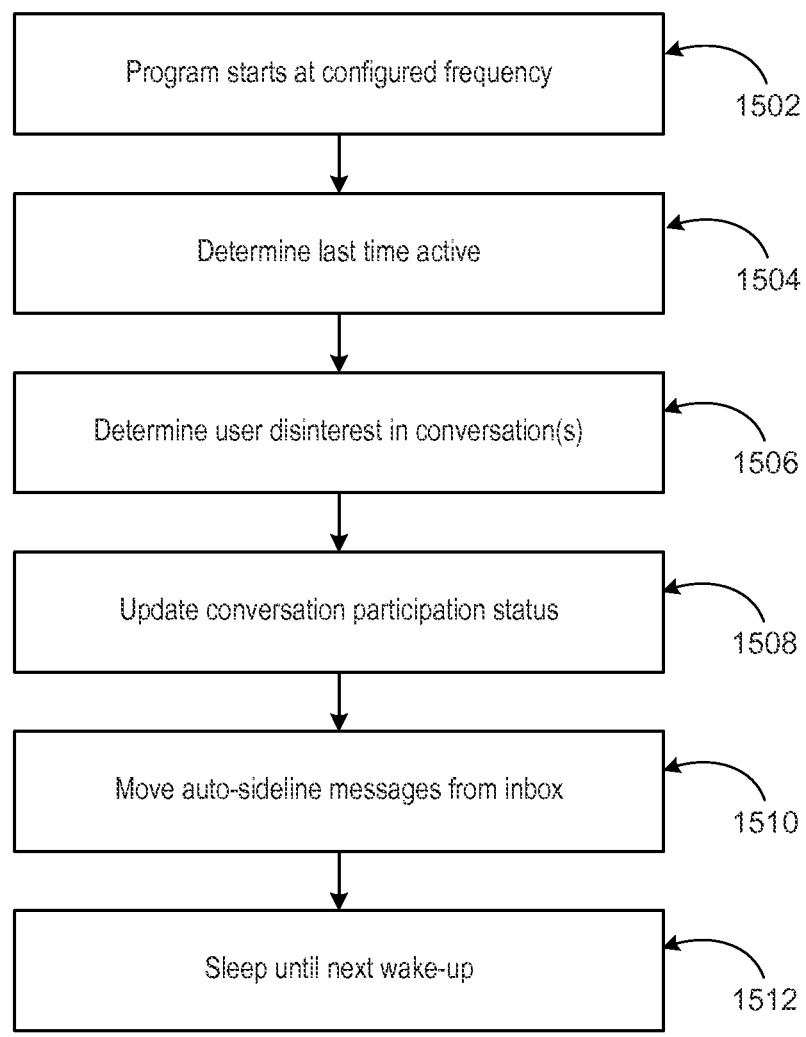
FIG. 15 is a flowchart depicting aspects of an example procedure in accordance with at least one embodiment of the invention.

FIG. 15 depicts aspects of an example procedure for a periodic program to systematically move any conversations user is not interested in to sideline (Thin and thick Client Versions) in accordance with at least one embodiment. Program starts at configured frequency (at 1502). Program determines last time when user was active. This may be done in multiple ways such as when last message was read, or by logging when user is actively looking at inbox, etc. (at 1504). Program queries all conversations that user is not interested in reading. There are multiple ways to determine user's disinterest (at 1506). For example, program would find what the configured idle time frame is, maximum messages that could be read, and minimum messages left unread. Alternatively ratio of read messages to unread messages. Many more criteria can be devised to deduce disinterest. Users and/or organizations can be given control configuring which criteria is to be used, and what the various parameters are for selected criterion. Program(s) update the shared data store to record user's dis-interest in conversation as indicated by auto-sideline routine to put specified conversation(s) on sideline along with reason (at 1508). Server side program(s) moves all messages in the inbox for specified conversation(s) from user's inbox folder to designated auto-sideline folder (at 1510). Program stops, or "sleeps" and will wake up to same after configured time (at 1512).

Figure 16:
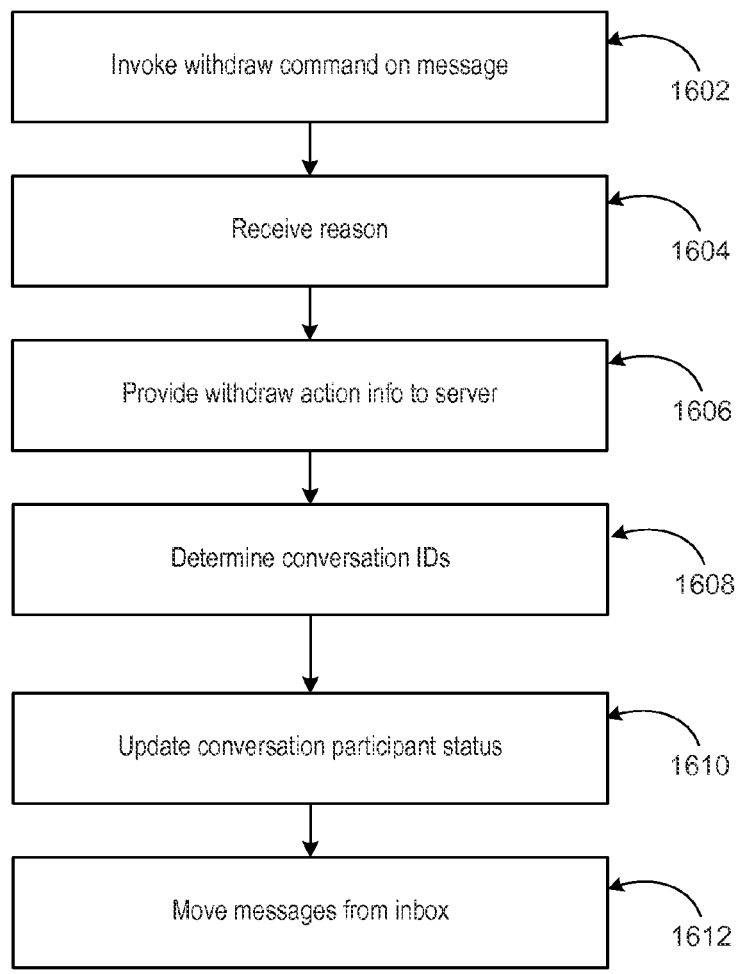
FIG. 16 is a flowchart depicting aspects of an example procedure in accordance with at least one embodiment of the invention.

FIG. 16 depicts aspects of an example procedure for user withdraws from conversation(s) (thin client version) in accordance with at least one embodiment. User selects one or more messages and invokes withdraw command (at 1602). Client program asks the user to enter a reason which is optional. User provides the information and chooses to proceed (at 1604). Client program calls the server program to perform the withdraw action. It sends list of message ids or conversation ids, and other information provided by the user to the server program. This may be done with one or multiple calls (at 1606). If message ids are sent, server program(s) finds conversation ids for the specified message ids (at 1608). Server program(s) update the shared data store to record user's preference to withdraw from specified conversation(s) (at 1610). Server side program(s) moves all messages in the inbox for specified conversation to designated folder for withdrawn messages (at 1612).

Figure 17:
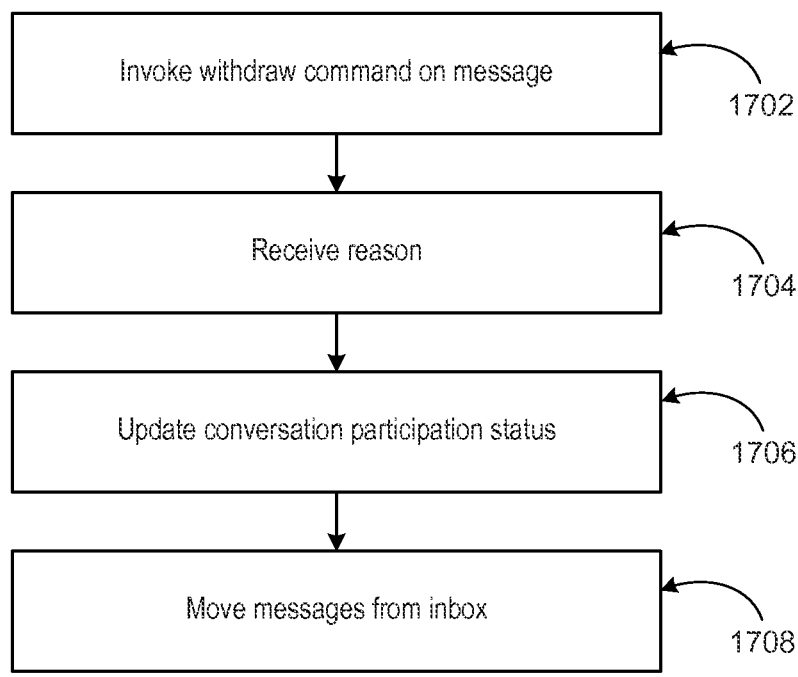
FIG. 17 is a flowchart depicting aspects of an example procedure in accordance with at least one embodiment of the invention.

FIG. 17 depicts aspects of an example procedure for user withdraws from conversation(s) (thick client version) in accordance with at least one embodiment. User selects one or more messages and invokes withdraw command (at 1702). Client program asks user to enter reason, which is optional. User provides the information and continues (at 1704). Client program updates the shared data store to record user's preference to withdraw conversation(s) (at 1706). Client program moves messages in the inbox for specified conversation(s) to designated folder for withdrawn messages (at 1708).

Figure 18:
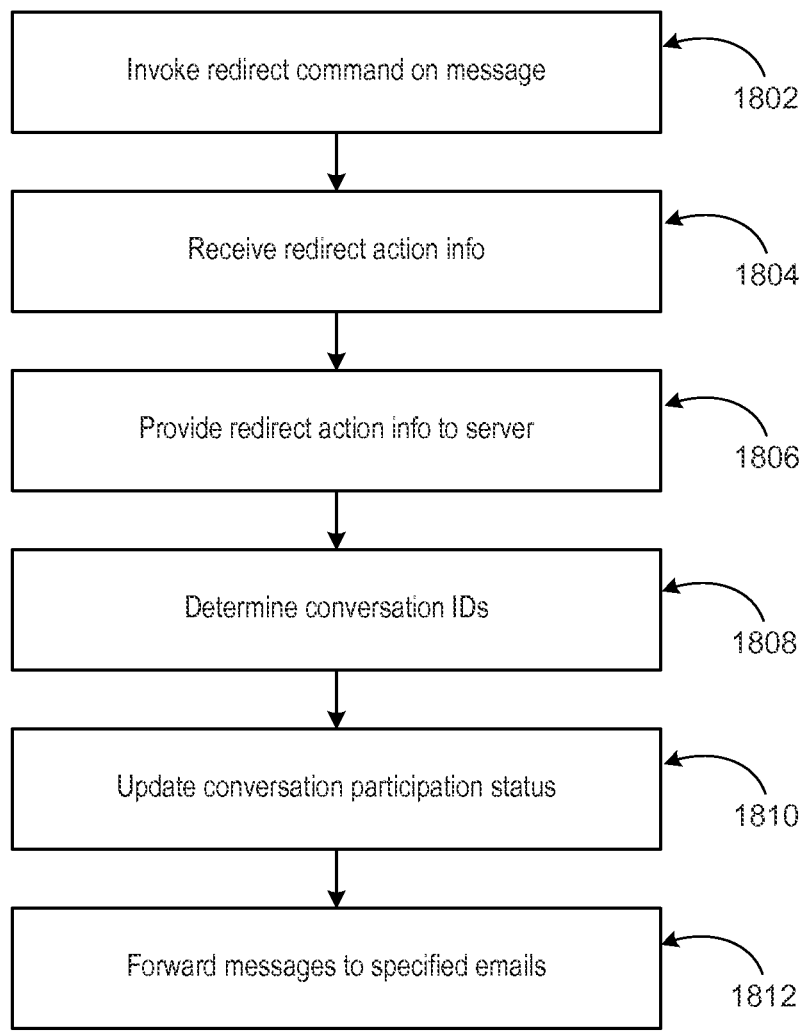
FIG. 18 is a flowchart depicting aspects of an example procedure in accordance with at least one embodiment of the invention.

FIG. 18 depicts aspects of an example procedure for user redirects conversation(s) (thin client version) in accordance with at least one embodiment. User selects one or more messages and invokes "redirect conversation" command (at 1802). Client program asks the user to enter a list of email addresses and a reason which is optional. User provides the information and chooses to proceed (at 1804). Client program calls the server program to perform the "redirect conversation" action. It sends list of message ids or conversation ids, and other information provided by the user to the server program. This may be done with one or multiple calls (at 1806). If message ids are sent, server program(s) finds conversation ids for the specified message ids (at 1808). Server program(s) update the shared data store to record user's preference to "redirect conversation" for specified conversation(s) to specified email addresses (at 1810). Server side program(s) forwards selected messages in the inbox for specified conversation(s) to specified email addresses. It (the program) includes specified reason in the forwarded email (at 1812).

Figure 19:
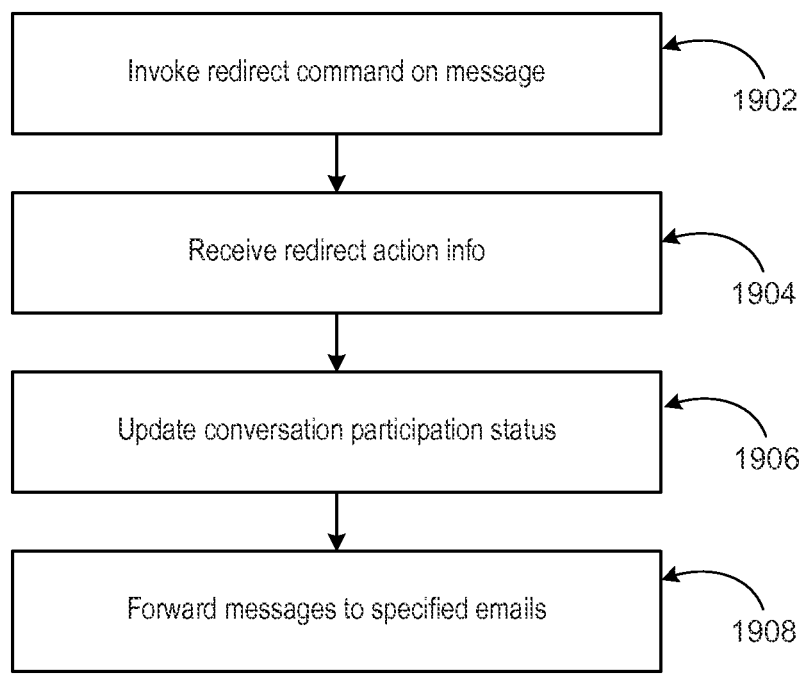
FIG. 19 is a flowchart depicting aspects of an example procedure in accordance with at least one embodiment of the invention.

FIG. 19 depicts aspects of an example procedure for user redirects conversation(s) (thick client version) in accordance with at least one embodiment. User selects one or more messages and invokes "redirect conversation" command (at 1902). Client program asks user to enter reason and folder where messages should be moved. User provides the information and continues (at 1904). Client program update the shared data store to record user's preference to "redirect conversation" for specified conversation(s) to specified email addresses (at 1906). Client program forwards selected messages in the inbox for specified conversation(s) to specified email addresses. It includes the specified reason in the forwarded email (at 1908).

Figure 20:
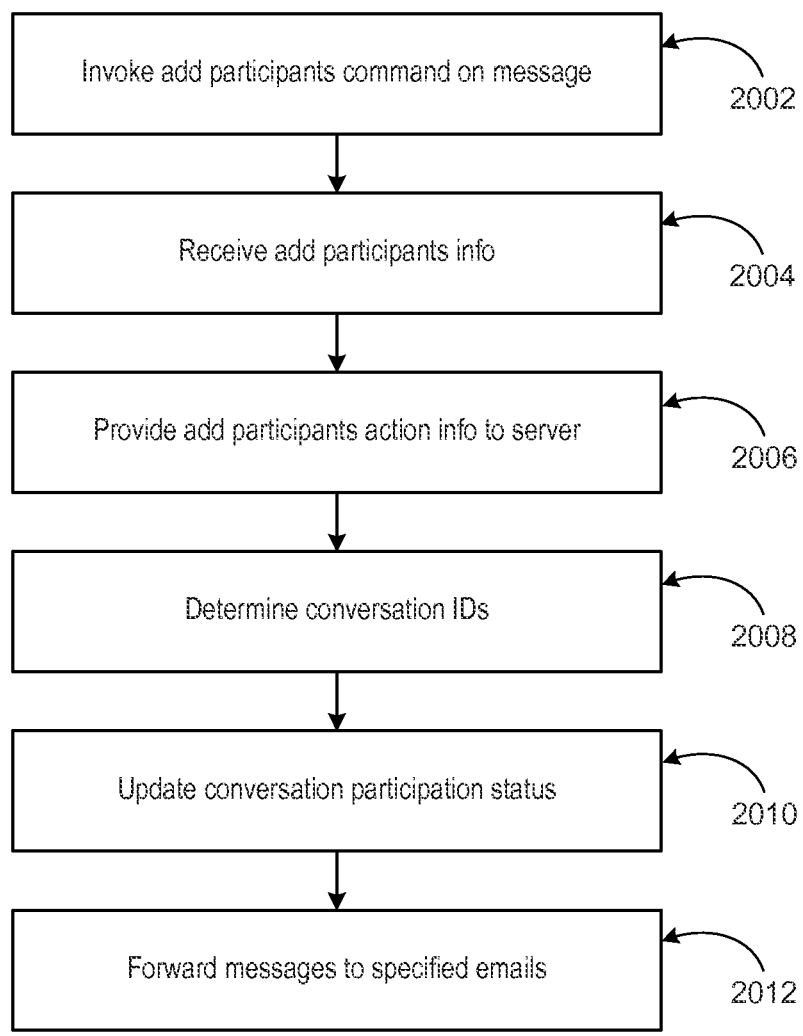
FIG. 20 is a flowchart depicting aspects of an example procedure in accordance with at least one embodiment of the invention.

FIG. 20 depicts aspects of an example procedure for user adds participant to conversation(s) (thin client version) in accordance with at least one embodiment. User selects one or more messages and invokes "add participant(s) to conversation" command (at 2002). Client program asks the user to enter a list of email addresses and a reason which is optional. User provides the information and chooses to proceed (at 2004). Client program calls the server program to perform the "add participant(s) to conversation" action (at 2006). It sends list of message ids and other information provided by the user to the server program. This may be done with one or multiple calls. Server program(s) finds conversation ids for the specified message ids (at 2008). Server program(s) update the shared data store to record user's preference to add specified email address(es) for specified conversation(s) (at 2010). Server side program(s) forwards selected messages to specified email addresses, and includes specified reason in the email (at 2012).

Figure 21:
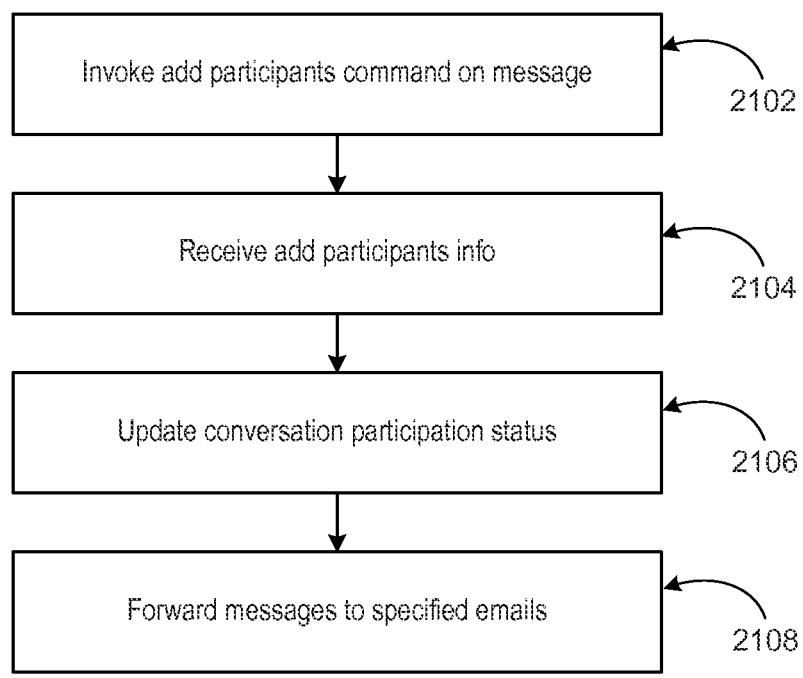
FIG. 21 is a flowchart depicting aspects of an example procedure in accordance with at least one embodiment of the invention.

FIG. 21 depicts aspects of an example procedure for user adds participant to conversation(s) (thick client version) in accordance with at least one embodiment. User selects one or more messages and invokes "add participant(s) to conversation(s)" command (at 2102). Client program asks user to enter participant(s)' email address(es) and reason. User provides the information and continues (at 2104). Client program updates the shared data store to record user's preference to add specified email address(es) for specified conversation(s) (at 2106). Client program Server side program(s) forwards selected messages to specified email addresses and includes specified reason in the forwarded email (at 2108).

Figure 22:
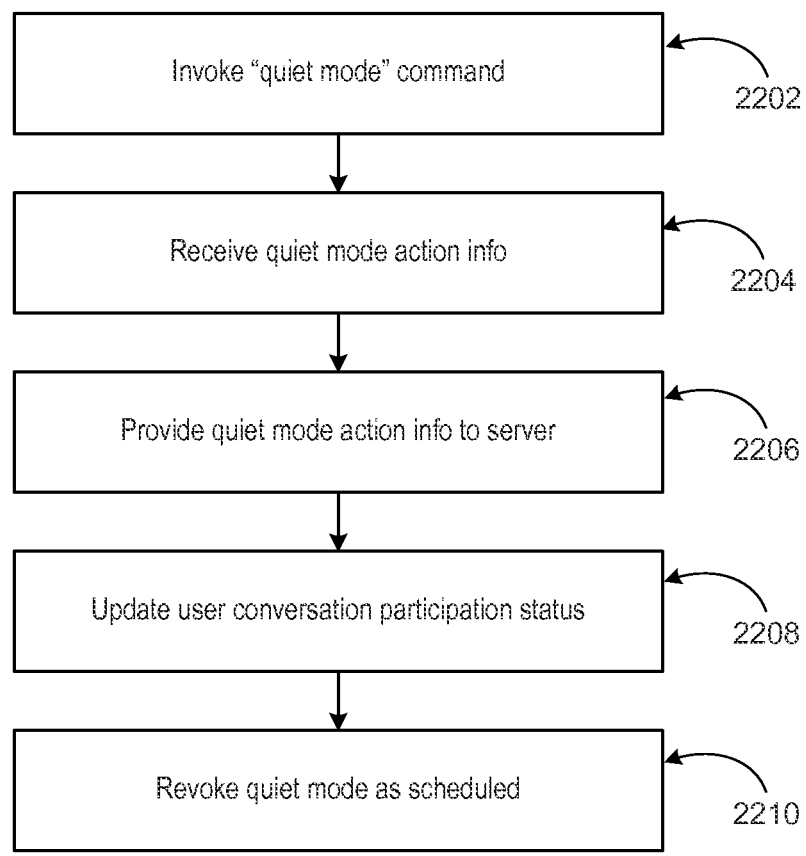
FIG. 22 is a flowchart depicting aspects of an example procedure in accordance with at least one embodiment of the invention.

FIG. 22 depicts aspects of an example procedure for user invokes "quiet mode" command (thin client version) in accordance with at least one embodiment. User invokes "quiet mode" command (at 2202). Client program asks the user to enter start time and duration or end time, and optionally information about recurring nature of quiet mode (at 2204). Client program calls the server program to perform "schedule quiet time" action (at 2206). Server program(s) records quiet time scheduling in shared data store (at 2208). At the scheduled time, quiet mode may be automatically revoked (at 2210).

Figure 23:
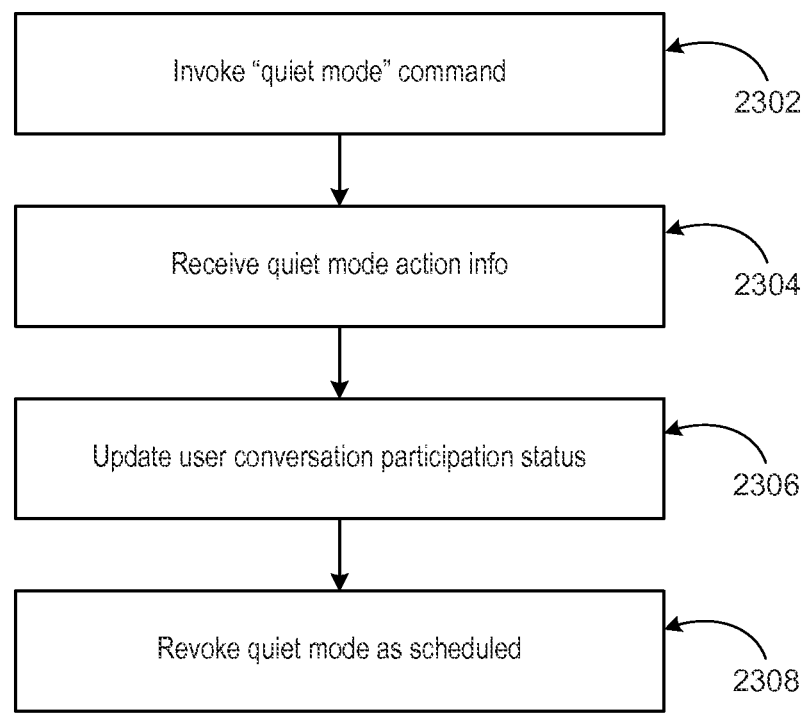
FIG. 23 is a flowchart depicting aspects of an example procedure in accordance with at least one embodiment of the invention.

FIG. 23 depicts aspects of an example procedure for user invokes "quiet mode" command (thick client version) in accordance with at least one embodiment. User invokes "quiet mode" command (at 2302). Client program asks the user to enter start time and duration or end time, and optionally information about recurring nature of quiet mode (at 2304). Client program records quiet time scheduling in shared data store (at 2306). At the scheduled time, quiet mode may be automatically revoked (at 2308).

Figure 24:
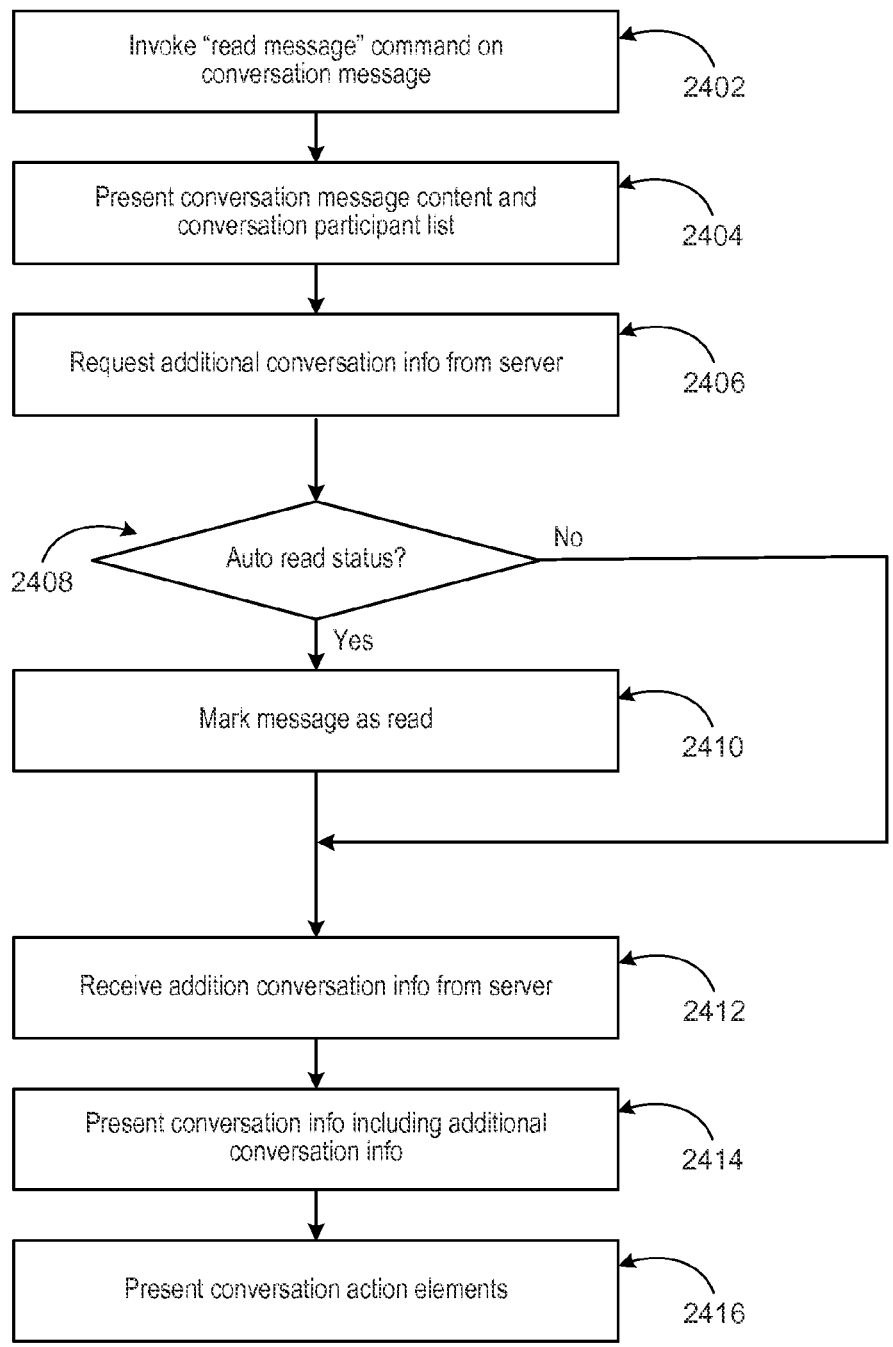
FIG. 24 is a flowchart depicting aspects of an example procedure in accordance with at least one embodiment of the invention.

FIG. 24 depicts aspects of an example procedure for user invokes "read message" command (thick or thin client version) in accordance with at least one embodiment. User selects a message and invokes "read message" command using appropriate user interface method (at 2402). Client program or plug-in opens a dialog in which addressee list is displayed along with email message content is displayed (at 2404). Client program or plug-in calls the server program—sending message id—to get further information about conversation participants and indicating that client is reading the message (at 2406). If embodiment implements automatic read status (check at 2408), server program marks the message as read in shared data store (at 2410). Server program sends information about the message and participants in conversation (at 2412). This may include participant information—depending on which features are implemented in embodiment—who have read the message, are on sideline, have withdrawn, redirected message, etc. along with reason and other affiliated information. This may also include information about message—depending on which features are implemented—if user needs to take action/is must read/is FYI, etc. if sender has overridden user's wish to be on sideline, withdraw, quiet mode, etc. If someone has suggested alternative way for conversation such as one-on-one phone, meeting, etc. Client program or plug-in presents message and participant information in suitable format by changing font, color coding, etc. to indicate conversation participation status and/or participant status (at 2414). Client side program will also set up mouse-over text to additional information (e.g., reason) for each participant address. Client side program adds suitable area and command buttons or menu items, or appropriate user interface to allow user to invoke actions for going to sideline, withdrawing from message, redirecting, adding participants, suggesting the conversation should be handled by telephone, meeting, or in other ways, etc.—depending on which features are implemented (at 2416).

Figure 25:
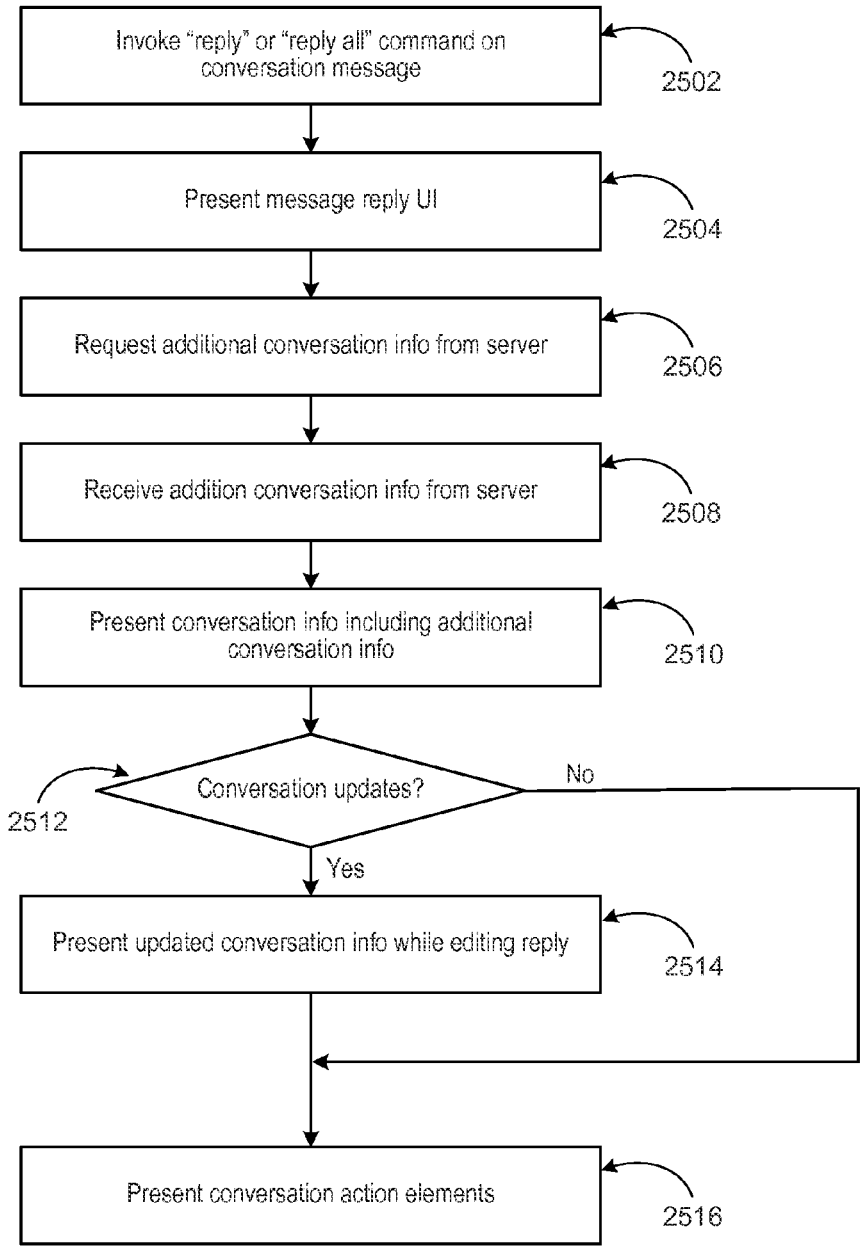
FIG. 25 is a flowchart depicting aspects of an example procedure in accordance with at least one embodiment of the invention.

FIG. 25 depicts aspects of an example procedure for user invokes "reply" or "reply-all" command (thick or thin client version) in accordance with at least one embodiment. User selects a message and invokes "reply" or "reply-all" command using appropriate user interface method (at 2502). Client program or plug-in opens a dialog in which addressee list is displayed along with email message content and an area for user to enter reply (at 2504). Client program or plug-in calls the server program—sending message id—to get further information about conversation participants and indicating that client is replying to the message (at 2506). Server program sends information about the message and all participants in conversation (at 2508). This includes participant information—depending on which features are implemented in embodiment—who have read the message, are on sideline, have withdrawn, redirected message, etc. along with reason and other affiliated information. This also includes information about message—depending on which features are implemented—if user needs to take action/is must read/is FYI, etc. if sender has overridden user's wish to be on sideline, withdraw, quiet mode, etc. If someone has suggested alternative way for conversation such as one-on-one phone, meeting, etc. Client program or plug-in presents message and participant information in suitable format by changing font, color coding, etc. to indicate conversation participation status and/or participant status (at 2510). Client side program may also set up mouse-over text to additional information (e.g., reason) for each participant address. In case of reply, only one participant is included. If the embodiment implements conversation updates (check at 2512), the send reply window also show a read-only area in which any emails about the present conversation received while the user is composing reply will get displayed (at 2514). This can done by multiple ways, such as client or plug-in checking for new emails periodically, or using events available to programmers, etc. Client side program adds suitable command buttons or menu items, or appropriate user interface to allow user to invoke actions for going to send message and simultaneously go on sideline, withdrawing from message, redirecting, adding participants, suggesting the conversation should be handled by telephone, meeting, or in other ways, etc.—depending on which features are implemented (at 2516).

Figure 26:
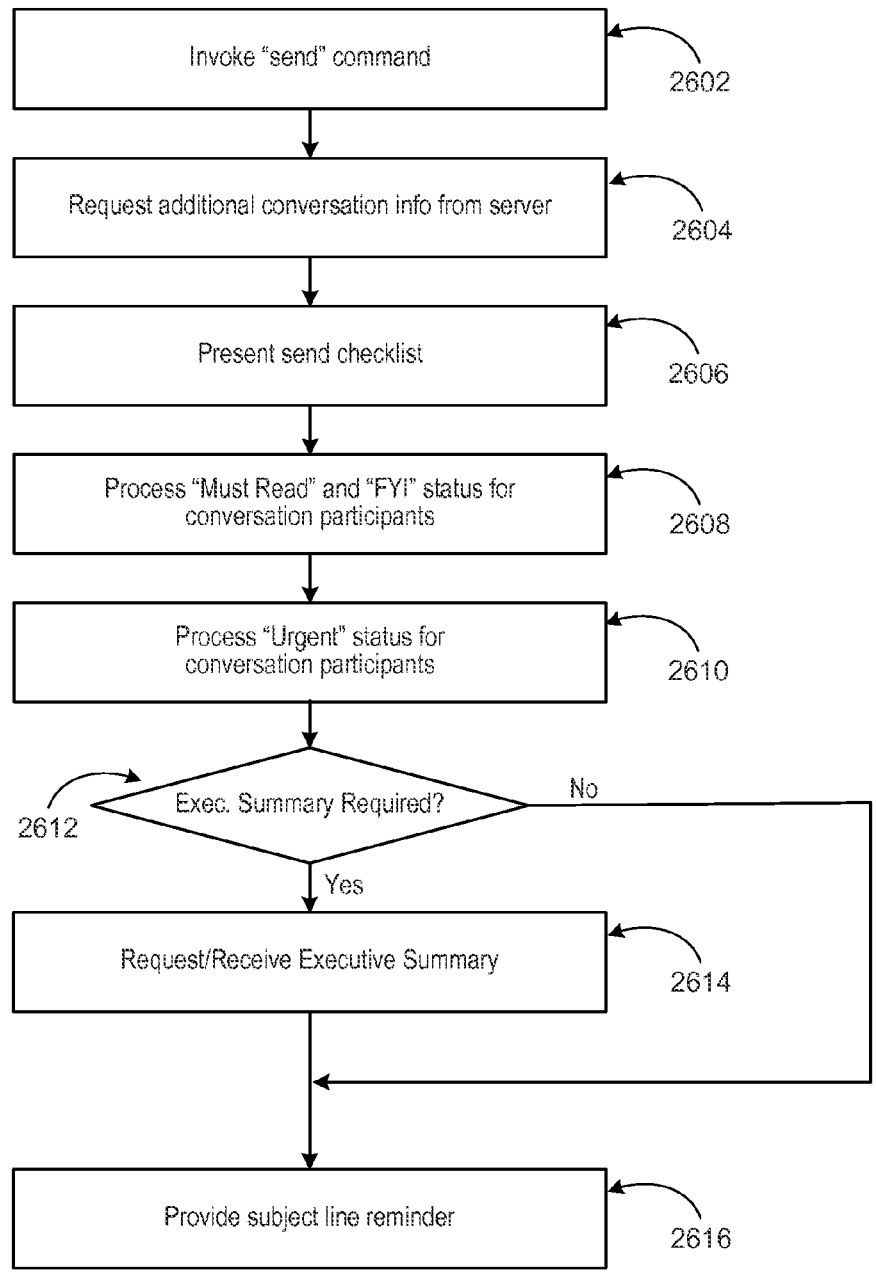
FIG. 26 is a flowchart depicting aspects of an example procedure in accordance with at least one embodiment of the invention.

FIG. 26 depicts aspects of an example procedure for user invokes "send" command (thick or thin client version) in accordance with at least one embodiment. User selects a message and invokes "send" command using appropriate user interface method (at 2602). Client program calls the server program—sending message id—to get further information about conversation participants (at 2604). Client program shows the sender a checklist screen or web page in which user can see all participants with information such as who is on TO, CC, and BCC lists, and depending on which features are implemented by embodiment—who is on sideline, withdrawn, in quiet mode, etc. (at 2606). By default addressees on TO list and not on sideline or withdrawn are marked as must read and rest are marked as FYI (at 2608). User may change these settings to needs to perform an action, or must read message, or if message is FYI, etc. If user indicates action or must read for a participant, and if that participant is on sideline or withdrawn, then sender's action will override recipient's setting for this particular message in conversation. By default message is not marked urgent for all of the addressees (at 2610). User may change messages urgent for selected addresses who are in quiet mode. This action will override receiving user's quiet mode. If program determines that executive summary is required based on configuration (check at 2612), (e.g., if any of the addressees requires executive summary and if the conversation is too long as deemed by setting) the sender is required to enter short executive summary for the conversation, otherwise executive summary is optional (at 2614). User is reminded to check that subject line is correctly reflecting conversation content (at 2616).

Figure 27:
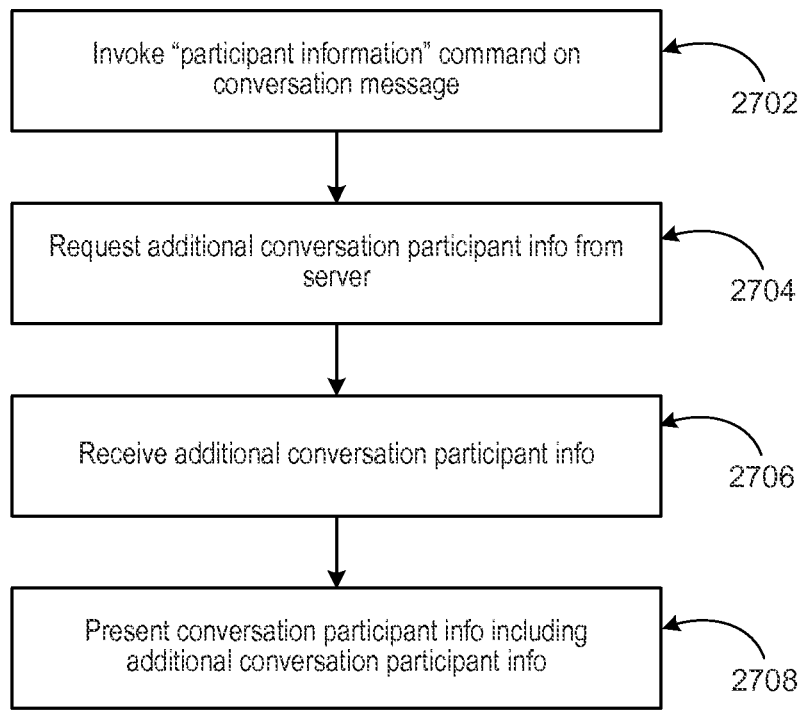
FIG. 27 is a flowchart depicting aspects of an example procedure in accordance with at least one embodiment of the invention.

FIG. 27 depicts aspects of an example procedure for user invokes "participant information" command (thick or thin client version) in accordance with at least one embodiment. User selects a message and invokes "participant information" command using appropriate user interface method (at 2702). Client program calls the server program—sending message id—to get further information about conversation participants (at 2704). Client program receives the information (at 2706) and shows the sender a conversation participation status and/or participant status screen with information showing conversation participation status and/or participant status such as sideline, withdrawn, redirected, etc. along with reason (at 2708). Also if available, client program will show last read status and date time when message was read.

Figure 28:
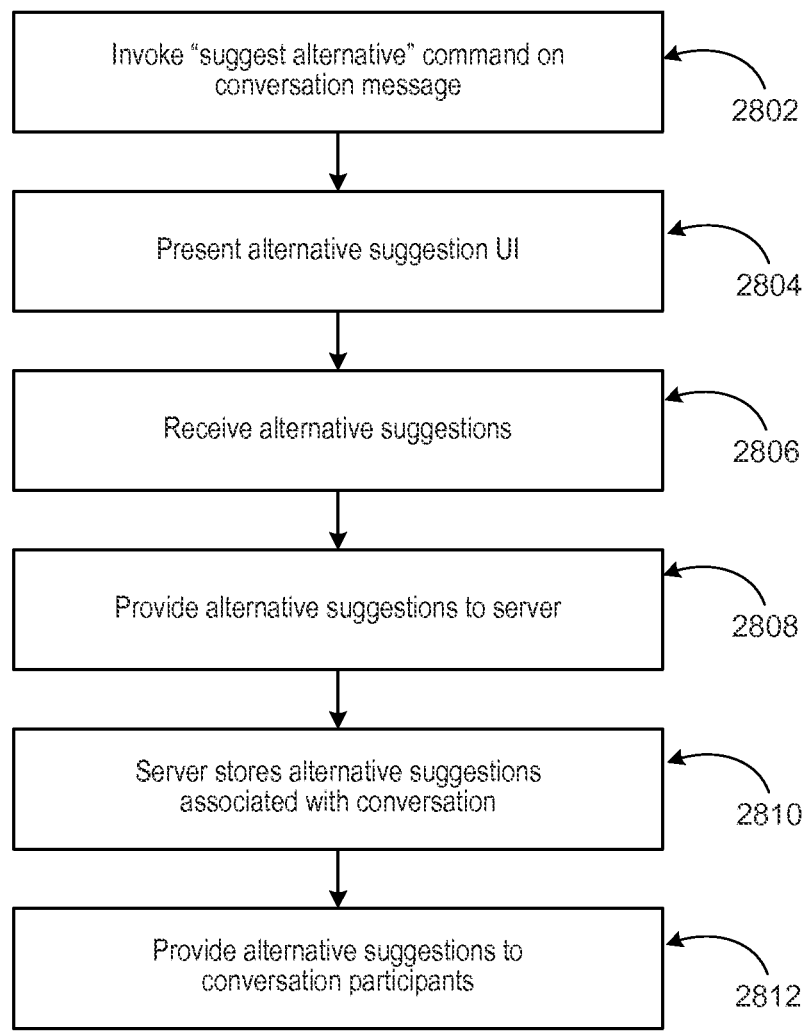
FIG. 28 is a flowchart depicting aspects of an example procedure in accordance with at least one embodiment of the invention.

FIG. 28 depicts aspects of an example procedure for user invokes "suggest alternative" command (thick or thin client version) in accordance with at least one embodiment. User selects a message and invokes "suggest alternative" command using appropriate user interface method (at 2802). Client program presents a dialog where user is asked to select suggestion choices such as, use of one-on-one conversation, phone, face-to-face meeting etc. (at 2804). Optionally user is given choice to stay anonymous, enter further comments, and select which participants should get the suggestion. User enters requested information and chooses to proceed (at 2806). Clients program sends information provided by user to the server (at 2808). Server programs(s) save this information in shared data store (at 2810). This information will be returned to client when users read and reply to messages pertaining to this conversation (at 2812). If multiple users suggest same alternative, the count will be kept. Server programs(s) may create email messages to selected participants and send email with suggestion. In some implementations, email will be sent on first suggestion of given type. Depending on implementation, suggesting participant's information will be included or kept anonymous.

Figure 29:
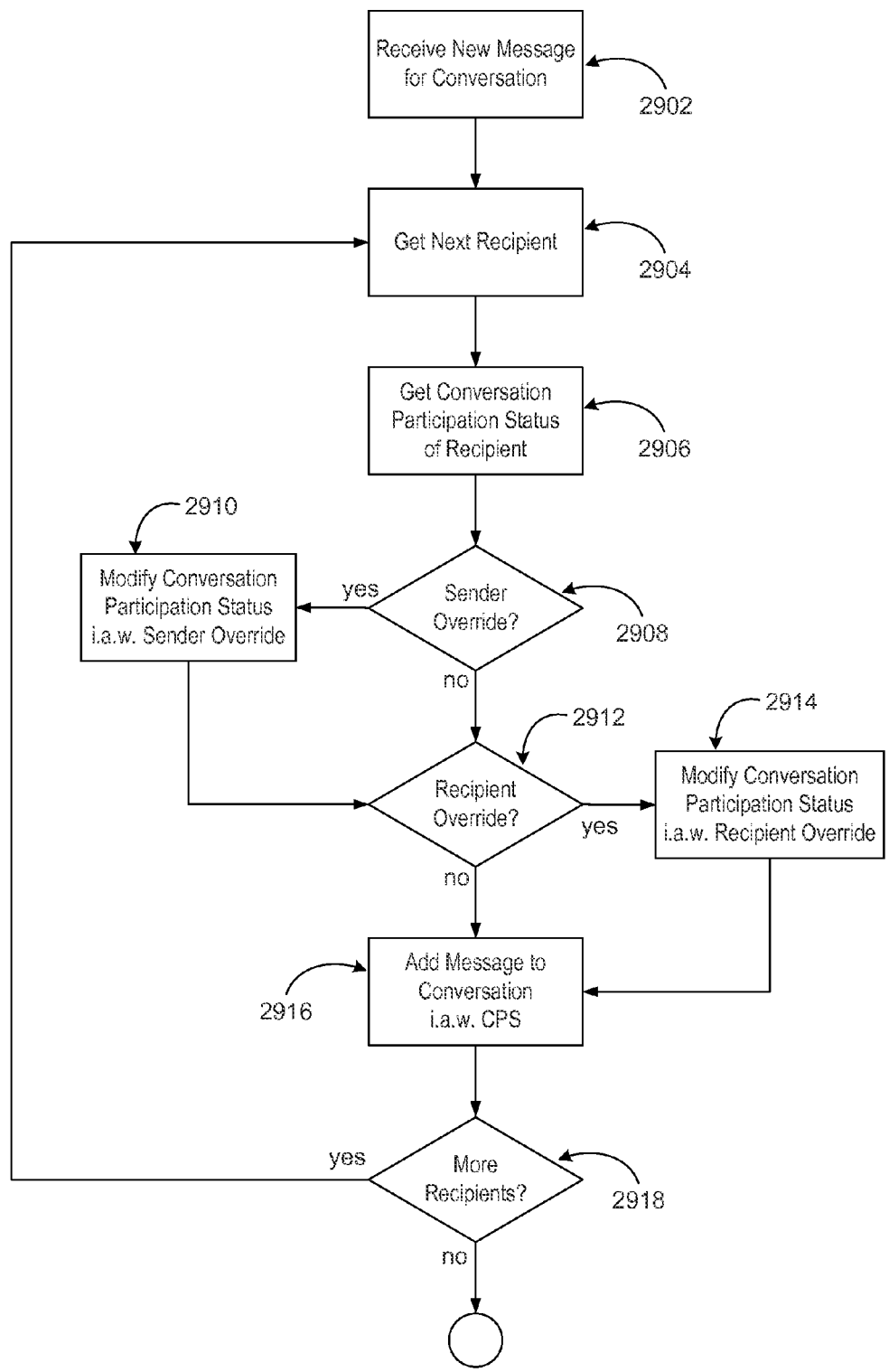
FIG. 29 is a flowchart depicting aspects of an example procedure for adding messages to electronic conversations in accordance with at least one embodiment of the invention.

FIG. 29 depicts aspects of an example procedure for adding messages to electronic conversations in accordance with at least one embodiment. At 2902, a new message may be received for an electronic conversation having multiple participants, for example, by the messaging server 202 of FIG. 2. At 2904, a next (e.g., a first) conversation participant may be selected. At 2906, a conversation participation status of the selected conversation participant may be obtained. At 2908, presence of a sender override with respect to the conversation participation status may be detected. For example, the conversation participation status obtained at 2906 may be "sideline", but the sender of the message may have indicated that the "sideline" status of the conversation participant should be overridden. If a sender override is detected, a procedure incorporating 2908 may progress to 2910. Otherwise, the procedure may progress to 2912. At 2910, the conversation participation status obtained at 2906 may be modified in accordance with the sender override detected at 2908. The modification may be persistent or temporary (e.g., until the message received at 2902 is processed).

At 2912, presence of a recipient override with respect to the conversation participation status may be detected. For example, the conversation participation status obtained at 2906 may be "active" or "reading" (e.g., the conversation participant is actively engaged in the conversation), but the recipient may currently be in quiet mode. If a recipient override is detected, a procedure incorporating 2912 may progress to 2914. Otherwise, the procedure may progress to 2916. At 2914, the conversation participation status obtained at 2906 may be modified in accordance with the recipient override detected at 2912. The modification may be persistent or temporary (e.g., until the message received at 2902 is processed or the recipient's quiet period elapses). At 2916, the message may be added to the electronic conversation in accordance with the selected conversation participant's conversation participation status, possibly as modified by 2910 and/or 2914. At 2918, presence of additional conversation participants and/or message recipients may be detected. When additional conversation participants and/or message recipients are detected, the procedure may progress to 2904. Otherwise, the procedure may progress to one or more operations not shown in FIG. 29.

Figure 30:
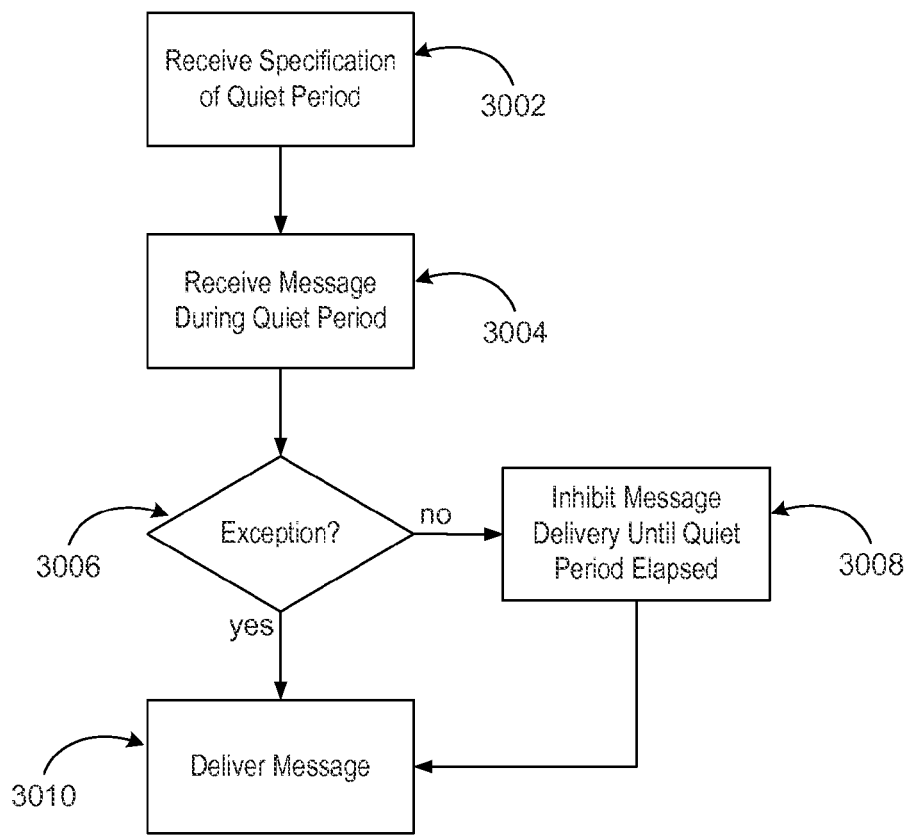
FIG. 30 is a flowchart depicting aspects of an example procedure for quiet mode in accordance with at least one embodiment of the invention.

FIG. 30 depicts aspects of an example procedure for quiet mode in accordance with at least one embodiment. At 3002, a specification of a quiet period may be received. For example, the messaging server 202 of FIG. 2 may receive an indication that a user is to be in quiet mode every Tuesday from 2 pm to 5 pm in the user's current time zone. At 3004, a message may be received for the user during the quiet period specified at 3002. At 3006, presence of a quiet mode exception may be detected. For example, the message may be marked urgent, or the user's quiet mode may have been overridden by another user. When the presence of a quiet mode exception is detected, a procedure incorporating 3006 may progress to 3010. Otherwise, the procedure may progress to 3008. At 3008, message delivery may be inhibited until the quiet period specified at 3002 has elapsed. For example, the message may be stored in a quiet mode folder for the user. At 3010, the message may be delivered. For example, the message may be delivered to the user's messaging inbox.

Figure 31:
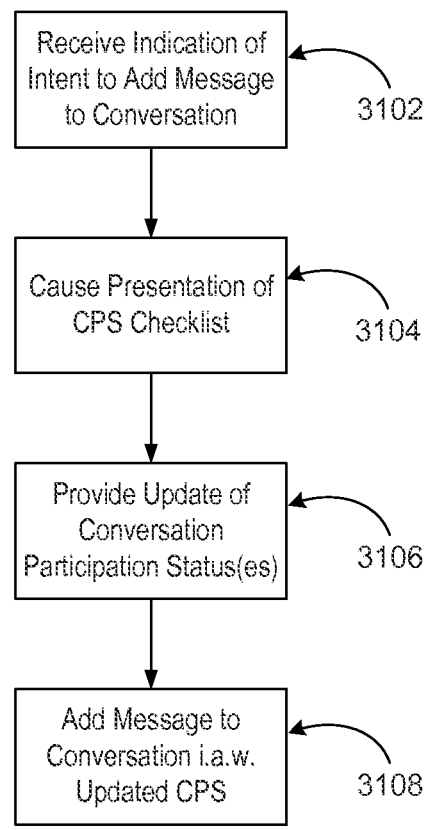
FIG. 31 is a flowchart depicting aspects of an example procedure for adding a message to an electronic conversation in accordance with at least one embodiment of the invention.

FIG. 31 depicts aspects of an example procedure for adding a message to an electronic conversation in accordance with at least one embodiment. At 3102, an indication of intent to add a message to an electronic conversation may be received. For example, a user may interact with a "send" button 710 of the graphical user interface 700 of FIG. 7 to indicate the intent. At 3104, presentation of a conversation participation status checklist may be caused. For example, the graphical user interface 800 of FIG. 8 may cause the presentation of the sender's checklist 802. At 3106, an update of one or more conversation participation statuses may be provided. For example, the messaging client 102 of FIG. 1 may provide the update to the messaging server 202 of FIG. 2 responsive to user interaction with the graphical user interface 800 of FIG. 8 (e.g., responsive to a modification of the presented conversation participation statuses). As the term is used herein, an "update" of a status such as a conversation participation status can include a temporary or permanent override of a current status value. When the override is temporary, the override may apply to a limited number of messages (e.g., one) and/or for a limited time, for example, as specified with a graphical user interface and/or as pre-defined. At 3108, the message may be added to the electronic conversation in accordance with the conversation participation statuses as updated at 3106, for example, by the messaging service 202 of FIG. 2.

Figure 32:
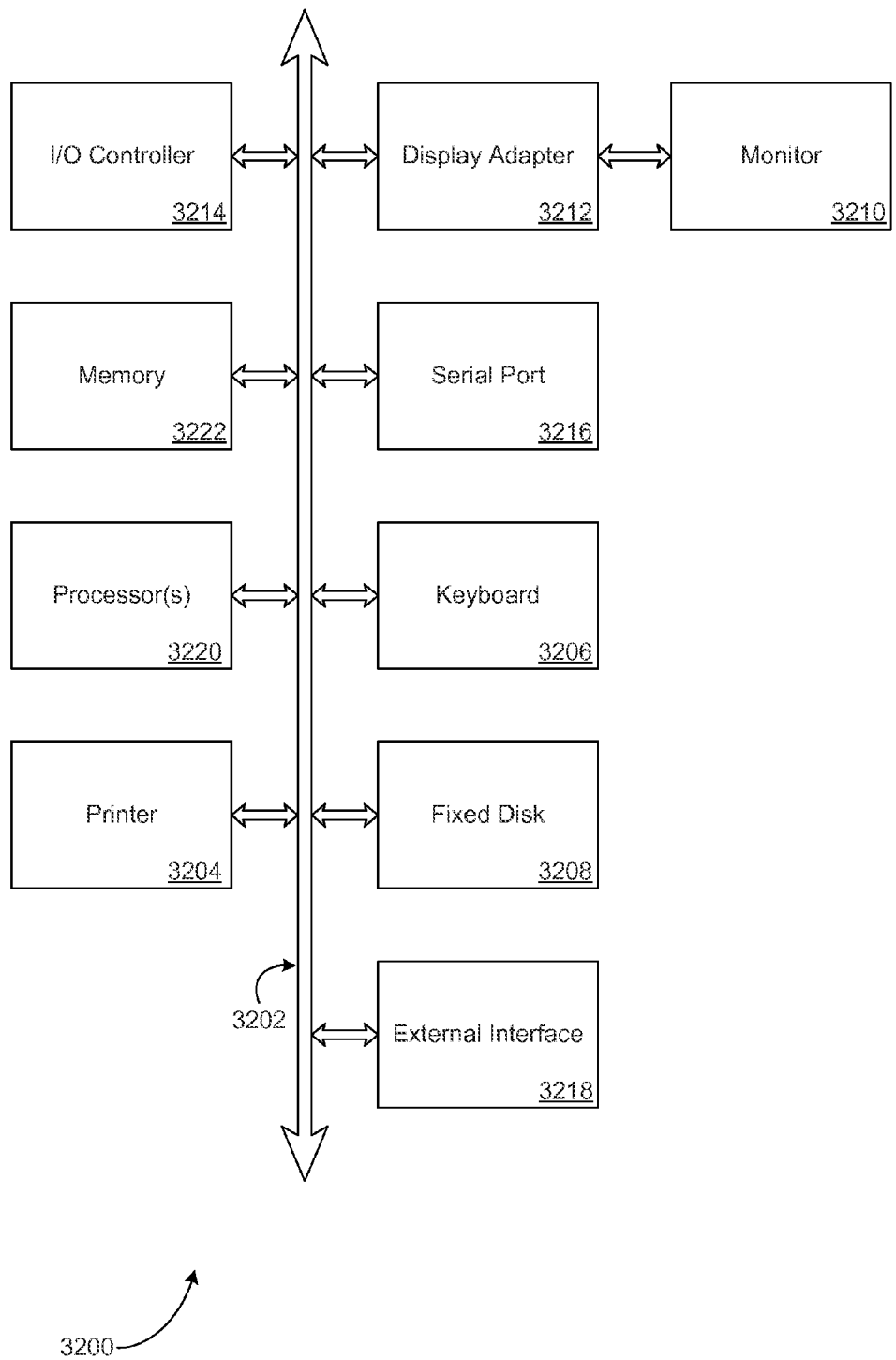
FIG. 32 is a schematic diagram depicting aspects of an example computer in accordance with at least one embodiment of the invention.

In accordance with at least one embodiment of the invention, the system, apparatus, methods, processes and/or operations described above may be wholly or partially implemented in the form of a set of instructions executed by one or more programmed computer processors such as a central processing unit (CPU) or microprocessor. Such processors may be incorporated in an apparatus, server, client or other computing device operated by, or in communication with, other components of the system. As an example, FIG. 32 depicts aspects of elements that may be present in a computing device and/or system 3200 configured to implement a method and/or process in accordance with some embodiments of the present invention. The subsystems shown in FIG. 32 are interconnected via a system bus 3202. Additional subsystems may include a printer 3204, a keyboard 3206, a fixed disk 3208, and a monitor 3210, which is coupled to a display adapter 3212. Peripherals and input/output (I/O) devices, which couple to an I/O controller 3214, can be connected to the computer system with any number of means known in the art, such as a serial port 3216. For example, the serial port 3216 or an external interface 3218 can be utilized to connect the computing device 3200 to further devices and/or systems not shown in FIG. 32 including a wide area network such as the Internet, a mouse input device, and/or a scanner. The interconnection via the system bus 3202 allows one or more processors 3220 to communicate with each subsystem and to control the execution of instructions that may be stored in a system memory 3222 and/or the fixed disk 3208, as well as the exchange of information between subsystems. The system memory 3222 and/or the fixed disk 3208 may embody a tangible, non-transitory computer-readable medium. Suitable computing devices in accordance with at least one embodiment need not have each of the components depicted in FIG. 32. Alternatively, or in addition, one or more of the computers depicted in FIG. 32 may be integrally combined and/or virtualized. For example, mobile computing devices such as tablet computers and smart phones may omit the printer 3204 and virtualize the keyboard 3206 with a monitor 3210 and/or screen that incorporates a touch-sensitive input function (e.g., the screen may display an image of a keyboard and generate virtual key-presses in response to corresponding screen touches). The fixed disk 3208 may be a solid state drive (SDD) and/or a collection of flash memory, and may be incorporated into the memory 3222.

Example embodiments in accordance with the invention include the following.

Example 1, a method for managing a set of electronic messages that are associated with a plurality of electronic conversations each having a plurality of participants, the method including: receiving a first electronic message of an electronic conversation and, in response, processing the first electronic message for a first participant of the electronic conversation in accordance with a default procedure; receiving a first indication that the electronic conversation has been assigned a conversation participation status by the first participant; providing a second indication that the electronic conversation has been assigned the conversation participation status for presentation to a second participant of the electronic conversation; and receiving a second electronic message of the electronic conversation and, in response, processing the second electronic message for the first participant in accordance with a non-default procedure, wherein the non-default procedure is selected based at least in part on the conversation participation status.

Example 2, a method in accordance with example 1, wherein: the set of electronic messages comprises email messages; the default procedure comprises placing the first electronic message in a default electronic message presentation collection; the conversation participation status comprises a sideline status; and the non-default procedure comprises placing the second electronic message in a sideline electronic message presentation collection distinct from the default electronic message presentation collection. Example 3, a method in accordance with example 1 or 2, further including: receiving information corresponding to a reason that the first participant assigned the conversation participation status to the electronic conversation; and providing the information corresponding to the reason for presentation to the second participant. Example 4, a method in accordance with example 3, wherein the information corresponding to the reason comprises text provided by the first participant.

Example 5, a method in accordance with example 1-3 or 4, wherein the electronic conversation was automatically assigned the conversation participation status based at least in part on a conversation participation status rule configured by the first participant. Example 6, a method in accordance with example 5, wherein the conversation participation status rule configured by the first participant assigns the conversation participation status based at least in part on a schedule. Example 7, a method in accordance with example 1-5 or 6, wherein: the default procedure comprises placing the first electronic message in a default electronic message presentation collection; the conversation participation status comprises a redirect status; and the non-default procedure comprises redirecting the second electronic message to a new participant of the electronic conversation and inhibiting placement of the second electronic message in an electronic message presentation collection of the first participant.

Example 8, a method in accordance with example 1-6 or 7, further including: responsive to providing the second indication, receiving an invitation for the first participant to modify the conversation participation status assigned to the electronic conversation; receiving an indication of approval from the first participant to modify the conversation participation status as specified by the invitation; and modifying the conversation participation status as specified by the invitation. Example 9, a method in accordance with example 1-7 or 8, wherein: the set of electronic messages comprises email messages; the conversation participation status comprises a closed status; and the non-default procedure comprises inhibiting delivery of the second electronic message to the plurality of participants of the electronic conversation. Example 10, a method in accordance with example 1-8 or 9, further including: receiving a conversation participation status override command associated with the second electronic message; determining a procedure for processing the second electronic message based at least in part on the conversation participation status override command; and processing the second electronic message in accordance with the determined procedure instead of the non-default procedure selected based at least in part on the assigned conversation participation status.

Example 11, an apparatus for managing a set of electronic messages that are associated with a plurality of electronic conversations each having a plurality of participants, the apparatus including: a conversation participation status module configured to, at least: maintain a conversation participation status corresponding to each participant of an electronic conversation of the plurality of electronic conversations; and provide for presentation to at least two of the plurality of participants of the electronic conversation information corresponding to the conversation participation status of at least two of the plurality of participants with respect to the electronic conversation; an electronic messaging engine configured to, at least: receive an electronic message associated with the electronic conversation; and process the electronic message with respect to each participant of the electronic conversation utilizing an electronic message processing procedure determined for the participant based at least in part on the maintained conversation participation status of the participant with respect to the electronic conversation; and one or more processors configured to facilitate at least the conversation participation status module and the electronic messaging engine.

Example 12, an apparatus in accordance with example 11, wherein: the conversation participation status module and the electronic message engine are implemented at least in part with one or more server computers; and the information corresponding to the conversation participation status of said at least two of the plurality of participants is presented with a plurality of client computers distinct from the one or more server computers. Example 13, an apparatus in accordance with example 11 or 12, wherein the conversation participation status module and the electronic message engine are implemented with a peer-to-peer swarm of computing devices. Example 14, an apparatus in accordance with example 11-12 or 13, further including a graphical user interface module configured at least to provide for presentation to a participant of the electronic conversation information identifying at least two of the plurality of participants of the electronic conversation and information identifying the conversation participation status of at least two of the plurality of participants with respect to the electronic conversation. Example 15, an apparatus in accordance with example 14, wherein the graphical user interface module is further configured to enable a participant of the electronic conversation to modify the conversation participation status of the participant with respect to the electronic conversation.

Example 16, an apparatus for managing a set of electronic messages that are associated with a plurality of electronic conversations each having a plurality of participants, the apparatus including: a graphical user interface module configured to, at least: provide for presentation to a first participant of an electronic conversation of the plurality of electronic conversations information associated with an electronic message of the electronic conversation, the information associated with the electronic message including an identification of at least two of the plurality of participants of the electronic conversation and an indication of a conversation participation status of at least two of the plurality of participants with respect to the electronic conversation, the presentation of the information to the first participant being based at least in part on the conversation participation status of the participant with respect to the electronic conversation; receive an update with respect to the conversation participation status of a second participant of the electronic conversation; and provide the updated conversation participation status for presentation to the first participant; and one or more processors configured to facilitate at least the graphical user interface module.

Example 17, an apparatus in accordance with example 16, wherein the presentation of the information associated with the electronic message visually associates the identification of the at least two of the plurality of participants with the corresponding indication of the conversation participation status of the participant. Example 18, an apparatus in accordance with example 17, wherein: the set of electronic messages comprises email messages; and the presentation of the information associated with the electronic message comprises a plurality of participant identifiers corresponding to email addresses, at least two of the plurality of participant identifiers modified or marked in accordance with the conversation participation status of the corresponding participant. Example 19, an apparatus in accordance with example 16-17 or 18, wherein: the graphics user interface module is configured to provide the first participant access to the plurality of electronic conversations utilizing an electronic message folder hierarchy; and the electronic conversation is associated with an electronic folder of the electronic message folder hierarchy based at least in part on the conversation participation status of the first participant with respect to the electronic conversation. Example 20, an apparatus in accordance with example 16-18 or 19, wherein the conversation participation status comprises at least one of: sidelined, delegated, redirected, withdrawn, closed, or quiet period.

Example 21, a method for managing a set of electronic messages that are associated with a plurality of electronic conversations each having a plurality of participants, the method including: receiving a first electronic message of an electronic conversation and, in response, processing the first electronic message for a first participant of the electronic conversation in accordance with a default procedure; receiving a first indication that the electronic conversation has been assigned a conversation participation status by the first participant; providing a second indication that the electronic conversation has been assigned the conversation participation status for presentation to a second participant of the electronic conversation; and processing the second electronic message for the second participant in accordance with a non-default procedure, wherein the non-default procedure is selected based at least in part on the conversation participation status.

Example 22, a method in accordance with example 21, wherein the processing of the second electronic message for the second participant in accordance with a non-default procedure occurs in response to interaction by the second participant with respect to a representation of the second electronic message. Example 23, a method in accordance with example 21 or 22, further including: receiving information corresponding to a reason that the first participant assigned the conversation participation status to the electronic conversation; and providing the information corresponding to the reason for presentation to the second participant. Example 24, a method in accordance with example 23, wherein the information corresponding to the reason is presented to the second participant responsive to interaction by the second participant with respect to a representation of the second electronic message.

Example 25, a method in accordance with example 1-9 or 10, wherein the second electronic message is associated with a conversation participation status override such that the second electronic message is processed for the first participant in accordance with the default procedure despite the conversation participation status assigned by the first participant. Example 26, a method in accordance with example 1-10 or 25, wherein the second electronic message is associated with a conversation participation status override and the non-default procedure is selected based at least in part on the conversation participation status and the conversation participation status override.

Example 26, method for managing a set of electronic messages, the method comprising: receiving a specification of a period of time associated with an electronic messaging quiet mode for a user; receiving an electronic message directed to the user during the period of time associated with the electronic messaging quiet mode; determining whether the electronic message is associated with an exception to the electronic messaging quiet mode; when the electronic message is associated with an exception to the electronic messaging quiet mode, delivering the electronic message to the user; and when the electronic message is not associated with an exception to the electronic messaging quiet mode, inhibiting delivery of the electronic message to the user until the period of time associated with the electronic messaging quiet mode has elapsed.

Example 27, method for managing a set of electronic messages that are associated with a plurality of electronic conversations each having a plurality of participants, the method comprising: receiving an indication that a conversation participant intends to add an electronic message to an electronic conversation having a plurality of participants; causing presentation of a conversation participation status checklist, the conversation participation status checklist including an indication of at least one conversation participation status for each of the plurality of participants of the electronic conversation; and responsive to interaction with the conversation participation status checklist by the conversation participant, providing an update to at least one conversation participation status of at least one of the plurality of participants of the electronic conversation; wherein the electronic message is added to the electronic conversation such that the conversation participation status of each of the plurality of participants is respected.

Example 28, method for managing a set of electronic messages, the method comprising: receiving a specification of a period of time associated with an electronic messaging participant status for a user; receiving an electronic message directed to the user during the period of time associated with the electronic messaging participant status; determining whether the electronic message is associated with an exception to the electronic messaging participant status; when the electronic message is associated with an exception to the electronic messaging participant status, delivering the electronic message to the user; and when the electronic message is not associated with an exception to the electronic messaging participant status, inhibiting delivery of the electronic message to the user until the period of time associated with the electronic messaging participant status has elapsed.

Example 29, method for managing a set of electronic messages that are associated with a plurality of electronic conversations each having a plurality of participants, the method comprising: receiving an indication that a conversation participant intends to add an electronic message to an electronic conversation having a plurality of participants; causing presentation of a conversation participation status checklist, the conversation participation status checklist including an indication of at least one conversation participation status for each of the plurality of participants of the electronic conversation; and responsive to interaction with the conversation participation status checklist by the conversation participant, overriding or providing an update to at least one conversation participation status of at least one of the plurality of participants of the electronic conversation; wherein the electronic message is added to the electronic conversation in accordance with the conversation participation status of each of the plurality of participants including the overridden or updated at least one conversation participation status.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without clear indication to the contrary.

As used herein, the term "alternatively" refers to selection of one of two or more alternatives, and is not intended to limit the selection to only those listed alternatives or to only one of the listed alternatives at a time, unless the context clearly indicates otherwise. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

What is claimed is:

1. A method for managing a set of electronic messages that are associated with a plurality of electronic conversations each having a plurality of participants, the method comprising:
    responsive to receiving a first electronic message of an electronic conversation, processing the first electronic message for a first participant of the electronic conversation in accordance with a default procedure;
    receiving a first indication that the electronic conversation has been assigned a conversation participation status by the first participant, the conversation participation status associated with the first participant with respect to the electronic conversation and indicating a variable level of interest representative of the first participant with respect to participating in the electronic conversation;
    providing a second indication that the electronic conversation has been assigned the conversation participation status for presentation to a second participant of the electronic conversation; and
    responsive to receiving a second electronic message of the electronic conversation, processing the second electronic message for the first participant in accordance with a non-default procedure selected based at least in part on the conversation participation status associated with the first participant with respect to the electronic conversation.

2. A method in accordance with claim 1, wherein:
    the set of electronic messages comprises email messages;
    the default procedure comprises placing the first electronic message in a default electronic message presentation collection;
    the conversation participation status comprises a sideline status; and
    the non-default procedure comprises placing the second electronic message in a sideline electronic message presentation collection distinct from the default electronic message presentation collection.

3. A method in accordance with claim 1, further comprising:
    receiving information corresponding to a reason that the first participant assigned the conversation participation status to the electronic conversation; and
    providing the information corresponding to the reason for presentation to the second participant.

4. A method in accordance with claim 3, wherein the information corresponding to the reason comprises text provided by the first participant.

5. A method in accordance with claim 1, wherein the electronic conversation was automatically assigned the conversation participation status based at least in part on a conversation participation status rule configured by the first participant.

6. A method in accordance with claim 5, wherein the conversation participation status rule configured by the first participant assigns the conversation participation status based at least in part on a schedule.

7. A method in accordance with claim 1, wherein:
    the default procedure comprises placing the first electronic message in a default electronic message presentation collection;
    the conversation participation status comprises a redirect status; and
    the non-default procedure comprises redirecting the second electronic message to a new participant of the electronic conversation and inhibiting placement of the second electronic message in an electronic message presentation collection of the first participant.

8. A method in accordance with claim 1, further comprising:
    responsive to providing the second indication, receiving an invitation for the first participant to modify the conversation participation status assigned to the electronic conversation;
    receiving an indication of approval from the first participant to modify the conversation participation status as specified by the invitation; and
    modifying the conversation participation status as specified by the invitation.

9. A method in accordance with claim 1, wherein:
    the set of electronic messages comprises email messages;
    the conversation participation status comprises a closed status; and
    the non-default procedure comprises inhibiting delivery of the second electronic message to the plurality of participants of the electronic conversation.

10. A method in accordance with claim 1, further comprising:
    receiving a conversation participation status override command associated with the second electronic message;
    determining a procedure for processing the second electronic message based at least in part on the conversation participation status override command; and
    processing the second electronic message in accordance with the determined procedure instead of the non-default procedure selected based at least in part on the assigned conversation participation status.

11. A method in accordance with claim 1, wherein the second electronic message is associated with a conversation participation status override such that the second electronic message is processed for the first participant in accordance with the default procedure despite the conversation participation status assigned by the first participant.

12. A method in accordance with claim 1, wherein the second electronic message is associated with a conversation participation status override and the non-default procedure is selected based at least in part on the conversation participation status and the conversation participation status override.

13. The method in accordance with claim 1, further comprising:
receiving a specification of a period of time from a recipient of an electronic message, the period of time associated with an electronic messaging participant status for the recipient, wherein delivery of electronic messages to the recipient is limited during the period of time;
receiving the electronic message directed to the recipient during the period of time associated with the electronic messaging participant status;
determining whether the electronic message is associated with an exception to the electronic messaging participant status;
when the electronic message is associated with an exception to the electronic messaging participant status, delivering the electronic message to the recipient; and
when the electronic message is not associated with an exception to the electronic messaging participant status, inhibiting delivery of the electronic message to the recipient until the period of time associated with the electronic messaging participant status has elapsed.

14. An apparatus for managing a set of electronic messages that are associated with a plurality of electronic conversations each having a plurality of participants, the apparatus comprising:
a graphical user interface module configured to, at least:
provide for presentation to a first participant of an electronic conversation of the plurality of electronic conversations information associated with an electronic message of the electronic conversation, the information associated with the electronic message including an identification of at least two of the plurality of participants of the electronic conversation, each of the at least two of the plurality of participants associated with an indication of a conversation participation status with respect to the electronic conversation, each conversation participation status indicating a variable level of interest representative of the corresponding participant with respect to participating in the electronic conversation, the presentation of the information to the first participant being based at least in part on the conversation participation status of the first participant with respect to the electronic conversation;
receive an update with respect to a conversation participation status associated with a second participant of the electronic conversation; and
provide the updated conversation participation status associated with the second participant for presentation to the first participant; and
one or more processors configured to facilitate at least the graphical user interface module.

15. An apparatus in accordance with claim 14, wherein the presentation of the information associated with the electronic message visually associates the identification of the at least two of the plurality of participants with the corresponding indication of the conversation participation status of the participant.

16. An apparatus in accordance with claim 15, wherein:
the set of electronic messages comprises email messages; and
the presentation of the information associated with the electronic message comprises a plurality of participant identifiers corresponding to email addresses, at least two of the plurality of participant identifiers modified or marked in accordance with the conversation participation status of the corresponding participant.

17. An apparatus in accordance with claim 14, wherein:
the graphics user interface module is configured to provide the first participant access to the plurality of electronic conversations utilizing an electronic message folder hierarchy; and
the electronic conversation is associated with an electronic folder of the electronic message folder hierarchy based at least in part on the conversation participation status of the first participant with respect to the electronic conversation.

18. An apparatus in accordance with claim 14, wherein the conversation participation status comprises at least one of: sidelined, delegated, redirected, withdrawn, closed, or quiet period.

19. A method for managing a set of electronic messages that are associated with a plurality of electronic conversations each having a plurality of participants, the method comprising:
responsive to receiving a first electronic message of an electronic conversation, processing the first electronic message for a first participant of the electronic conversation in accordance with a default procedure;
receiving a first indication that the electronic conversation has been assigned a conversation participation status by the first participant, the conversation participation status associated with the first participant with respect to the electronic conversation and indicating a variable level of interest representative of the first participant with respect to participating in the electronic conversation;
providing a second indication that the electronic conversation has been assigned the conversation participation status for presentation to a second participant of the electronic conversation; and
processing a second electronic message for the second participant in accordance with a non-default procedure, wherein the non-default procedure is selected based at least in part on the conversation participation status associated with the first participant with respect to the electronic conversation.

20. A method in accordance with claim 19, wherein the processing of the second electronic message for the second participant in accordance with a non-default procedure occurs in response to interaction by the second participant with respect to a representation of the second electronic message.

21. A method in accordance with claim 19, further comprising:
receiving information corresponding to a reason that the first participant assigned the conversation participation status to the electronic conversation; and
providing the information corresponding to the reason for presentation to the second participant.

* * * * *